(12) United States Patent
Logvinov et al.

(10) Patent No.: US 12,112,350 B2
(45) Date of Patent: Oct. 8, 2024

(54) DEVICES FOR HOME BASED ELECTRIC VEHICLE (EV) CHARGING

(71) Applicant: IoTecha Corp., Cranbury, NJ (US)

(72) Inventors: Oleg Logvinov, Weston, CT (US); Kimberly Sarubbi, Brentwood, TN (US); Adrian Weidmann, Deephaven, MN (US)

(73) Assignee: IoTecha Corp., Cranbury, NJ (US)

( * ) Notice: Subject to any disclaimer, the term of this patent is extended or adjusted under 35 U.S.C. 154(b) by 0 days.

(21) Appl. No.: 17/933,335

(22) Filed: Sep. 19, 2022

(65) Prior Publication Data

US 2023/0084015 A1   Mar. 16, 2023

Related U.S. Application Data

(63) Continuation of application No. PCT/US2022/076331, filed on Sep. 13, 2022.
(Continued)

(51) Int. Cl.
| | |
|---|---|
| *G06Q 30/02* | (2023.01) |
| *B60L 53/30* | (2019.01) |
| *B60L 53/36* | (2019.01) |
| *G01S 19/51* | (2010.01) |
| *G06Q 30/0251* | (2023.01) |

(Continued)

(52) U.S. Cl.
CPC ........ *G06Q 30/0251* (2013.01); *B60L 53/305* (2019.02); *B60L 53/36* (2019.02); *G01S 19/51* (2013.01); *G06Q 30/0271* (2013.01); *H02J 7/00032* (2020.01); *H04N 7/0255* (2013.01); *H04W 4/06* (2013.01); *H04W 4/21* (2018.02); *B60L 53/00* (2019.02); *G06Q 30/0214* (2013.01); *G06Q 30/0269* (2013.01); *H02J 7/0048* (2020.01)

(58) Field of Classification Search
None
See application file for complete search history.

(56) References Cited

U.S. PATENT DOCUMENTS

| | | |
|---|---|---|
| 9,352,659 B1 | 5/2016 | Turner |
| 9,371,007 B1 | 6/2016 | Penilla et al. |
| | (Continued) | |

FOREIGN PATENT DOCUMENTS

| | | |
|---|---|---|
| CN | 107089157 A | 8/2017 |
| CN | 109291827 A | 2/2019 |
| | (Continued) | |

OTHER PUBLICATIONS

Ferreira João C., V. Monteiro, João L. Afonso, "Smart Electric Vehicle Charging System", IEEE Intelligent Vehicles Symposium (IV), Baden-Baden Germany, pp. 758-763, Jun. 5-9, 2011, ISBN: 978-1-4577-0890-9, DOI: 10.1109/IVS.2011.5940579.
(Continued)

*Primary Examiner* — David J Stoltenberg
(74) *Attorney, Agent, or Firm* — NK Patent Law

(57) ABSTRACT

Devices are disclosed for home based electric vehicle (EV) charging. According to one embodiment, an EV charger includes a processor, a memory electrically coupled with the processor, EV charging circuitry electrically coupled with the processor, a network interface electrically coupled with the processor, and a broadcast transmitter electrically coupled with the processor.

17 Claims, 22 Drawing Sheets

Related U.S. Application Data

(60) Provisional application No. 63/331,450, filed on Apr. 15, 2022, provisional application No. 63/275,468, filed on Nov. 4, 2021, provisional application No. 63/243,381, filed on Sep. 13, 2021.

(51) Int. Cl.
| | |
|---|---|
| *H02J 7/00* | (2006.01) |
| *H04N 7/025* | (2006.01) |
| *H04W 4/06* | (2009.01) |
| *H04W 4/21* | (2018.01) |
| *B60L 53/00* | (2019.01) |
| *G06Q 30/0214* | (2023.01) |

(56) References Cited

U.S. PATENT DOCUMENTS

| | | | |
|---|---|---|---|
| 9,373,967 B1 | 6/2016 | Sullivan | |
| 9,592,742 B1 | 3/2017 | Sosinov | |
| 9,851,213 B2 | 9/2017 | Oh et al. | |
| 10,168,170 B2 | 1/2019 | North et al. | |
| 10,628,842 B2 | 4/2020 | Granville, III | |
| 10,809,085 B2 | 10/2020 | North et al. | |
| 11,312,257 B2 | 4/2022 | Lee | |
| 2006/0282310 A1 | 12/2006 | Burch | |
| 2008/0032721 A1* | 2/2008 | MacDonald | H04L 51/214 |
| | | | 455/466 |
| 2011/0204847 A1* | 8/2011 | Turner | G06Q 30/0264 |
| | | | 320/109 |
| 2011/0213656 A1 | 9/2011 | Turner | |
| 2012/0047036 A1* | 2/2012 | Allan | G07F 15/005 |
| | | | 705/21 |
| 2012/0116575 A1* | 5/2012 | Prosser | B60L 53/18 |
| | | | 705/14.38 |
| 2012/0209699 A1 | 8/2012 | Cochran et al. | |
| 2012/0265459 A1 | 10/2012 | Sfaelos | |
| 2013/0042292 A1* | 2/2013 | Buff | H04N 21/43637 |
| | | | 725/127 |
| 2013/0132994 A1* | 5/2013 | Murphy | H04N 21/2665 |
| | | | 725/23 |
| 2013/0179061 A1 | 7/2013 | Gadh et al. | |
| 2013/0198787 A1* | 8/2013 | Perry, II | H04N 21/2585 |
| | | | 725/86 |
| 2013/0227011 A1 | 8/2013 | Sharma | |
| 2013/0328525 A1 | 12/2013 | Robert | |
| 2014/0012448 A1* | 1/2014 | Tripathi | B60L 53/60 |
| | | | 320/108 |
| 2014/0028255 A1 | 1/2014 | Brimacombe | |
| 2015/0127248 A1 | 5/2015 | Fisher et al. | |
| 2015/0149221 A1 | 5/2015 | Tremblay | |
| 2015/0356576 A1 | 12/2015 | Malaviya et al. | |
| 2016/0176307 A1 | 6/2016 | Becker | |
| 2016/0375780 A1 | 12/2016 | Penilla et al. | |
| 2017/0169648 A1 | 6/2017 | Penilla et al. | |
| 2017/0357480 A1 | 12/2017 | La Placa | |
| 2018/0105051 A1 | 4/2018 | Zheng | |
| 2018/0111494 A1* | 4/2018 | Penilla | B60L 53/60 |
| 2018/0131221 A1* | 5/2018 | Ambroziak | B60L 3/12 |
| 2018/0220305 A1* | 8/2018 | Lei | H04W 16/14 |
| 2018/0232773 A1 | 8/2018 | Menendez et al. | |
| 2018/0337450 A1* | 11/2018 | Tinaphong | H04N 5/50 |
| 2019/0130451 A1 | 5/2019 | Logvinov | |
| 2019/0268743 A1* | 8/2019 | Cho | G06Q 30/0265 |
| 2019/0275893 A1 | 9/2019 | Sham | |
| 2019/0275907 A1 | 9/2019 | Lee | |
| 2019/0383637 A1 | 12/2019 | Teske | |
| 2020/0003571 A1 | 1/2020 | Shirakawa et al. | |
| 2020/0124653 A1 | 4/2020 | Rahbari Asr | |
| 2020/0242646 A1 | 7/2020 | Edwards et al. | |
| 2020/0262305 A1 | 8/2020 | Chakraborty | |
| 2020/0333151 A1 | 10/2020 | Akhtar | |
| 2021/0033414 A1 | 2/2021 | North et al. | |
| 2021/0182919 A1* | 6/2021 | Wyckoff | B60L 53/51 |
| 2022/0014575 A1* | 1/2022 | Corl | H04L 45/64 |
| 2022/0050143 A1 | 2/2022 | Maeda | |

FOREIGN PATENT DOCUMENTS

| | | |
|---|---|---|
| JP | 2011197932 A | 10/2011 |
| KR | 20180071150 A | 6/2018 |
| KR | 20190102589 A | 9/2019 |
| WO | 2019212419 A1 | 11/2019 |

OTHER PUBLICATIONS

USPTO; Non-Final Action for U.S. Appl. No. 17/933,316 dated Jan. 3, 2023, 11 pages.
Ajibade Akonai, Olumide, Non-Final Office Action for U.S. Appl. No. 17/933,308 dated Feb. 24, 2023.
Alvarez, Raquel, Final Office Action for U.S. Appl. No. 17/933,316 dated Apr. 14, 2023.
ISA/US, International Search Report and Written Opinion for corresponding PCT Patent Application No. PCT/US2020/76331, mailed Mar. 27, 2023, 15 pages.
Golson, Jordan, "These EV Chargers Are Free. The Catch? They've Got Ads", In: wired.com, Jun. 11, 2015, URL: https://wired.com/2015/06/ev-chargers-free-catch-theyve-got-ads/, 2 pages.
USPTO; Non-Final Action for U.S. Appl. No. 17/933,316 dated Feb. 24, 2023, 18 pages.
WIPO, International Preliminary Report on Patentability for corresponding International Patent Application No. PCT/US2022/076331, mailed on Mar. 5, 2024, 10 pages.
USPTO: Non-Final Office Action for U.S. Appl. No. 18/482,335 dated Dec. 6, 2023, 14 pages.

* cited by examiner

DIAGRAM
1200

FLOW DIAGRAM
1400B

| Attributes | Values |
|---|---|
| Name | |
| Email Address | |
| Phone Number | |
| Address | |
| City/DMA | |
| Zipcode | |
| Charger ID | |
| Issued SSID Password | |
| Gender | Male, Female, Non-Binary |
| Age | 1-12, 13-18, 19-24, 25-34, 35-44, 45-54, 55+ |
| HH Income | 0-50K, 50K-75K, 75K-100K, 100K+ |
| EV Make & Model | |
| Preferred Big Box Retailer | Target, Walmart, Best Buy, Nordstrom, Macy's |
| Preferred DIY Retailer | The Home Depot, Lowe's, Menards, Ace, True-Valu |
| Preferred Charity | |

DIAGRAM
1600

US 12,112,350 B2

DEVICES FOR HOME BASED ELECTRIC VEHICLE (EV) CHARGING

PRIORITY CLAIM

This application is a continuation application of PCT Patent Application No. PCT/US2022/076331 filed Sep. 13, 2022, which claims the benefit of U.S. Provisional Patent Application Ser. No. 63/243,381 filed Sep. 13, 2021; the benefit of U.S. Provisional Patent Application Ser. No. 63/275,468 filed Nov. 4, 2021; and the benefit of U.S. Provisional Patent Application Ser. No. 63/331,450 filed Apr. 15, 2022; the entire contents of which are all hereby incorporated herein by reference.

TECHNICAL FIELD

The present invention relates generally to the field of electric vehicle (EV) chargers. More particularly, methods, devices, and systems are disclosed for home based EV charging.

BACKGROUND

With the growth of electric vehicles (EVs), the EV charging equipment market is expected to have a compound annual growth rate (CAGR) exceeding 27 percent through 2025. In addition to the public chargers, users are installing home based EV chargers for convenience. In addition to the added costs of purchasing an EV, the home based charger and installation adds even more costs. However, home based EV chargers enable new opportunities for targeted advertising. Targeted advertising has the objective of delivering an advertisement to a user who is likely to find the advertising useful and suited to his interests and, thus, act, such as to purchase the advertised product or service, based on the advertisement.

Accordingly, there remains a need for improved methods, devices, and systems for home based EV charging. Additionally, a need exists to help offset the cost of obtaining and using home based EV chargers.

SUMMARY

Disclosed herein are methods, devices, and systems for home based electric vehicle (EV) charging. Additionally, methods, devices, and systems are disclosed for offsetting costs associated with home based EV charging.

According to one embodiment, a method is implemented on at least one computing device. The method includes detecting a presence of a user within a proximity of a home-based electric vehicle (EV) charger, receiving user information provided by the user, determining charging enabled parking space influenced media data based on the user information, and transmitting the charging enabled parking space influenced media data to a user interface (UI) associated with the home-based EV charger. The home-based EV charger is provided to the user at least partially in response to receiving the user information.

In some embodiments, the user information may include user survey information. In certain embodiments, the user survey information may be requested during a user EV charger account registration by the user.

In some embodiments, the user information may also include user social networking information.

In certain embodiments, the user social networking information may be provided by an Instagram® account, a YouTube® account, a Facebook® account, a Twitter® account, a TikTok® account, a Pinterest® account, a Snapchat® account, and/or the like.

In some embodiments, the user information may include user professional networking information. In certain embodiments, the user professional networking information may be provided by a LinkedIn® account, a Chamber of Commerce account, a SCORE® account, a Rotary Club account, and/or the like.

In some embodiments, the user information may include user technical profession organization information.

In certain embodiments, the user technical profession organization information may be provided by at least one of an Association for Computing Machinery ACM® account, a Network Professional Association account, a CompTIA® account, an Association for Women in Computing account, an Association of Information Technology Professionals account, a National Society of Professional Engineers account, an American Association of Engineering Societies account, a Society of Women Engineers account, an International Engineering Consortium account, an Electrical and Electronics Engineers (IEEE®) account, and/or the like.

In some embodiments, the user information may include user purchasing information. In certain embodiments, the user purchasing information may include user home ownership information and the user home ownership information may include a user physical address. In further embodiments, determining charging enabled parking space influenced media data may be further based on an assessed value of the user physical address.

In some embodiments, the charging enabled parking space influenced media data may include an advertisement, a product promotion, a product placement, and/or the like.

In some embodiments, the method may further include determining an offset value used to offset a purchase price of the home-based EV charger based on the user information. In certain embodiments, determining the offset value may be further based on receiving referral information on a referral person from the user. In further embodiments, the referral information may include a first portion provided by the user during a user EV charger account registration and a second portion may be provided by the referral person during a referral EV charger account registration.

In some embodiments, the user information may include user purchasing information of the user and the referral information may include referral purchasing information of the referral person.

In some embodiments, the user information may include an assessed value of a physical address associated with the user and the referral information may include an assessed value of a physical address associated with the referral person.

In some embodiments, the user information may include historical user information.

In some embodiments, the user information may include near real time user information.

In some embodiments, the charging enabled parking space influenced media data may include garage influenced media data.

In another embodiment, a computing device includes a memory and at least one processor. The at least one processor is configured for detecting a presence of a user within a proximity of a home-based EV charger, receiving user information provided by the user, determining charging enabled parking space influenced media data based on the user information, and transmitting the charging enabled parking space influenced media data to a UI associated with the home-based EV charger. The home-based EV charger is provided to the user at least partially in response to receiving the user information.

In another embodiment, a non-transitory computer-readable storage medium stores instructions to be implemented on at least one computing device. The at least one computing device includes at least one processor. The instructions when executed by the at least one processor cause the at least one computing device to perform a method. The method includes detecting a presence of a user within a proximity of a home-based EV charger, receiving user information provided by the user, determining charging enabled parking space influenced media data based on the user information, and transmitting the charging enabled parking space influenced media data to a UI associated with the home-based EV charger. The home-based EV charger is provided to the user at least partially in response to receiving the user information.

According to another embodiment, a method is implemented on at least one computing device. The method includes detecting a presence of a user within a proximity of a home-based EV charger, receiving charging related data associated with the user, determining charging enabled parking space influenced media data based on the user charging data, and transmitting the charging enabled parking space influenced media data to a UI associated with the home-based EV charger.

In some embodiments, the charging related data may include first charging data associated with the user using the home-based EV charger.

In some embodiments, the charging related data may further include second charging data associated with the user that is distinct from the home-based EV charger.

In some embodiments, the charging related data may be associated with a plurality of EV vehicles.

In some embodiments, the charging related data may include an estimated amount of energy used for each charging session.

In some embodiments, the charging related data may include an estimated cost for each charging session.

In some embodiments, the charging related data may include a delta time between a first charging event and a second charging event.

In some embodiments, the method may further include receiving home automation data associated with a location of the home-based EV charger.

In some embodiments, the home automation data may include Internet-of-Things (IoT) data associated with a plurality of IoT devices.

In some embodiments, the home automation data may be received via an application programming interface (API) of a virtual assistant.

In some embodiments, the charging enabled parking space influenced media data may include a ranking of EV energy use associated with the user as compared with a plurality of other users. The plurality of other users may be distinct from the user.

In some embodiments, the method may further include receiving other charging data associated with the plurality of other users, and determining the ranking of EV energy use associated with the user based on the user charging data and the other charging data.

In some embodiments, the method may further include determining the plurality of other users based on a location of the home-based EV charger and locations of a plurality of other home-based EV chargers associated with the plurality of other users.

In some embodiments, the method may further include determining the plurality of other users based on a vehicle type associated with the user and a plurality of other vehicle types associated with the plurality of other users.

In some embodiments, the method may further include determining the plurality of other users based on a vehicle type associated with the user and a plurality of other vehicle types associated with the plurality of other users.

In some embodiments, the method may further include determining the plurality of other users based on networking information associated with the user and the plurality of other users, wherein the networking information includes at least one of social networking information and professional networking information.

In some embodiments, the method may further include determining an incentive for the user based on the ranking of EV energy use associated with the user.

In some embodiments, the incentive may be applied to offset a purchase cost of the home-based EV charger.

In some embodiments, the charging enabled parking space influenced media data may include garage influenced media data.

In another embodiment, a computing device includes a memory and at least one processor. The at least one processor is configured for detecting a presence of a user within a proximity of a home-based EV charger, receiving charging related data associated with the user, determining charging enabled parking space influenced media data based on the user charging data, and transmitting the charging enabled parking space influenced media data to a UI associated with the home-based EV charger.

In another embodiment, a non-transitory computer-readable storage medium stores instructions to be implemented on at least one computing device. The at least one computing device includes at least one processor. The instructions when executed by the at least one processor cause the at least one computing device to perform a method. The method includes detecting a presence of a user within a proximity of a home-based EV charger, receiving charging related data associated with the user, determining charging enabled parking space influenced media data based on the user charging data, and transmitting the charging enabled parking space influenced media data to a UI associated with the home-based EV charger.

According to another embodiment, a method is implemented on at least one computing device. The method includes receiving purchase information data associated with a user, determining purchasing pattern data based on the purchase information data, determining charging enabled parking space influenced media data based on the purchasing pattern data, detecting a presence of the user within a proximity of a home-based EV charger, and transmitting the charging enabled parking space influenced media data to a UI associated with the home-based EV charger upon detecting the presence of the user.

In some embodiments, the purchase information data may include energy purchase data.

In some embodiments, the energy purchase data may include EV charger usage data.

In some embodiments, the EV charger usage data may include EV location data and time-of-charge data.

In some embodiments, the energy purchase data may include home energy purchase data.

In some embodiments, the purchasing pattern data may include a frequency of two or more purchases, a timing of the two or more purchases, and/or a quantity of the two or more purchases.

In some embodiments, at least a portion of the purchase information data may include receipt data of a specific purchase.

In some embodiments, the purchasing pattern data may include a necessity factor associated with the specific purchase.

In some embodiments, at least of portion of the purchase information data may be provided by an application programming interface associated with a virtual assistant.

In some embodiments, at least of portion of the purchase information data may be provided by user survey information.

In some embodiments, the user survey information may be requested during a user EV charger account registration by the user.

In some embodiments, the charging enabled parking space influenced media data and the UI may provide a point-of-sale (POS) interface.

In some embodiments, the POS interface may be associated with a loyalty program subscribed to by the user and the UI may be electrically coupled with the home-based EV charger.

In some embodiments, the method may further include determining an incentive for the user based at least partially on the purchasing pattern data.

In some embodiments, the purchasing information data may include EV ownership information and the EV ownership information includes at least two EV purchases.

In some embodiments, the purchasing information data may include user home ownership information and the user home ownership information may include at least two home purchases.

In some embodiments, the charging enabled parking space influenced media data may include an advertisement, a product promotion, a product placement, and/or the like.

In some embodiments, the method may further include determining an offset value used to offset a purchase price of the home-based EV charger based on the purchasing pattern data.

In some embodiments, the charging enabled parking space influenced media data may include garage influenced media data.

In another embodiment, a computing device includes a memory and at least one processor. The at least one processor is configured for receiving purchase information data associated with a user, determining purchasing pattern data based on the purchase information data, determining charging enabled parking space influenced media data based on the purchasing pattern data, detecting a presence of the user within a proximity of a home-based EV charger, and transmitting the charging enabled parking space influenced media data to a UI associated with the home-based EV charger upon detecting the presence of the user.

In another embodiment, a non-transitory computer-readable storage medium stores instructions to be implemented on at least one computing device. The at least one computing device includes at least one processor. The instructions when executed by the at least one processor cause the at least one computing device to perform a method. The method includes receiving purchase information data associated with a user, determining purchasing pattern data based on the purchase information data, determining charging enabled parking space influenced media data based on the purchasing pattern data, detecting a presence of the user within a proximity of a home-based EV charger, and transmitting the charging enabled parking space influenced media data to a UI associated with the home-based EV charger upon detecting the presence of the user.

According to another embodiment, a method is implemented on at least one computing device. The method includes detecting a presence of a user within a proximity of a home-based EV charger, receiving user information associated with the user, determining charging enabled parking space influenced media data based on historical user information provided by the user, and transmitting the charging enabled parking space influenced media data to a UI associated with the home-based EV charger. The charging enabled parking space influenced media data comprises an environmental impact index associated with the user.

In some embodiments, the environmental impact index may be determined based on an estimated carbon footprint associated with the user.

In some embodiments, the user information may include energy purchase data associated with the user.

In some embodiments, the energy purchase data may include home energy purchase data.

In some embodiments, the energy purchase data may include home energy purchase data.

In some embodiments, the energy purchase data may include a cost per unit volume of energy.

In some embodiments, the user information may include a mileage component associated of an EV associated with the user.

In some embodiments, the user information may include user submitted purchase data.

In some embodiments, the user submitted purchase data may include EV purchase data.

In some embodiments, the user submitted purchase data may include heating, ventilation, and air conditioning (HVAC) purchase data.

In some embodiments, the user submitted purchase data may include receipt data. In certain embodiments, the user submitted purchase data may include at least one electronically scanned receipt. In further embodiments, the user submitted purchase data may include at least one emailed receipt.

In some embodiments, the charging enabled parking space influenced media data may further include information on a redeemable token. The redeemable token may be issued based on the user information.

In some embodiments, the redeemable token may include a user option for a charitable contribution.

In some embodiments, the redeemable token may include a user option to credit towards an energy purchase.

In some embodiments, the user information may include purchase information data provided by an application programming interface (API) associated with a virtual assistant.

In some embodiments, the charging enabled parking space influenced media data may be provided at least partially in response to receiving the user information.

In some embodiments, the user information may be historical user information.

In some embodiments, the user information may be near real time user information.

In some embodiments, the charging enabled parking space influenced media data may include garage influenced media data.

In another embodiment, a computing device includes a memory and at least one processor. The at least one processor is configured for detecting a presence of a user within a proximity of a home-based EV charger, receiving user information associated with the user, determining charging enabled parking space influenced media data based on historical user information provided by the user, and transmitting the charging enabled parking space influenced media data to a UI associated with the home-based EV charger. The charging enabled parking space influenced media data comprises an environmental impact index associated the user.

In another embodiment, a non-transitory computer-readable storage medium stores instructions to be implemented on at least one computing device. The at least one computing device includes at least one processor. The instructions when executed by the at least one processor cause the at least one computing device to perform a method. The method includes detecting a presence of a user within a proximity of a home-based EV charger, receiving user information associated with the user, determining charging enabled parking space influenced media data based on historical user information provided by the user, and transmitting the charging enabled parking space influenced media data to a UI associated with the home-based EV charger. The charging enabled parking space influenced media data comprises an environmental impact index associated the user.

According to another embodiment, a method is implemented on at least one computing device. The method includes determining a first plurality of available charging appointments associated with a first charging schedule associated with a first home-based EV charger, providing the first plurality of available charging appointments to a first graphical user interface (GUI) of a first client computing device associated with a first user, receiving a first appointment selection of the first plurality of available charging appointments from the first GUI, and providing a first confirmed charging appointment indication to the first GUI associated with the first appointment selection.

In some embodiments, the method may further include providing a first plurality of estimated costs for charging associated with the first plurality of available charging appointments.

In some embodiments, the method may further include receiving first location data associated with first client computing device, and receiving second location data associated with the first home-based EV charger. The first plurality of available charging appointments may be based on the first location data and the second location data.

In some embodiments, the method may further include receiving the first charging schedule from a second GUI associated with a second client computing, wherein the second client computing device is associated with a first owner of the first home-based EV charger.

In some embodiments, the method may further include providing a first request charging appointment indication to the second GUI upon receiving the first appointment selection.

In some embodiments, the method may further include providing first user profile information to the second GUI upon receiving the first appointment selection.

In some embodiments, the method may further include receiving first authorization indication associated with the first request charging appointment indication from the second GUI.

In some embodiments, the method may further include providing a first charging authorization code to the first client computing device, and providing the first charging authorization code and an authorized time window to the first home-based EV charger.

In some embodiments, the method may further include receiving a first charging event complete indication associated with the first charging authorization code from the first home-based EV charger, providing a debit authorization to a first monetary account associated with the first user, and providing a credit authorization to an second monetary account associated with the first owner.

In some embodiments, the method may further include determining an environmental impact index associated with the first location data and the second location data, and providing a redeemable token to the first client computing device based on the environmental impact index.

In some embodiments, the first user computing device may be a smart phone, a tablet, a smart watch, a smart TV, a laptop, a personal computer, and/or the like.

In some embodiments, the first client computing device may be embedded within an EV associated with the first user.

In some embodiments, the server may be a virtual server hosted in a cloud computing environment.

In some embodiments, the server may provide a first secure web portal to the first GUI.

In some embodiments, the first GUI may be provided by a first application specific program executing on the first client computing device. In certain embodiments, the first application specific program may be an iOS® app, an Android® OS app, and/or the like.

In some embodiments, the first GUI may be provided by a first web browser. In certain embodiments, the first web browser may be a Microsoft Internet Explorer® browser, a Microsoft Edge® browser, an Apple Safari® browser, a Google Chrome® browser, a Mozilla Firefox® browser, an Opera® browser, and/or the like.

In another embodiment, a server includes a memory and at least one processor. The at least one processor is configured for determining a first plurality of available charging appointments associated with a first charging schedule associated with a first home-based EV charger, providing the first plurality of available charging appointments to a first GUI of a first client computing device associated with a first user, receiving a first appointment selection of the first plurality of available charging appointments from the first GUI, and providing a first confirmed charging appointment indication to the first GUI associated with the first appointment selection.

In another embodiment, a non-transitory computer-readable storage medium stores instructions to be implemented on at least one computing device. The at least one computing device includes at least one processor. The instructions when executed by the at least one processor cause the at least one computing device to perform a method. The method includes determining a first plurality of available charging appointments associated with a first charging schedule associated with a first home-based EV charger, providing the first plurality of available charging appointments to a first GUI of a first client computing device associated with a first user, receiving a first appointment selection of the first plurality of available charging appointments from the first GUI, and providing a first confirmed charging appointment indication to the first GUI associated with the first appointment selection.

In another embodiment, a method is implemented on an electric vehicle (EV) charger for determining relative position of a mobile device to an EV charger in accordance with embodiments of the present disclosure. The method includes receiving known location data associated with a global position of the EV charger, wherein the known location data has an accuracy better than 10 centimeters, receiving first global navigation satellite system (GNSS) timestamped data associated with the EV charger from a first constellation of GNSS satellites, determining first GNSS location data based on the first GNSS timestamped data, and determining first GNSS error data based on the first GNSS location data and the known location data.

In some embodiments, the method may further include transmitting the first GNSS error data to a mobile device, wherein the mobile device is configured to determine a relative position to the EV charger based on the first GNSS error data.

In some embodiments, the mobile device may be at least one of an EV, a smart phone, a smart tablet, and a smart watch.

In some embodiments, the method may further include providing charging enabled parking space influenced media data to a user interface (UI) associated with the EV charger based on the relative position.

In some embodiments, the method may further include receiving second GNSS timestamped data associated with a mobile device within proximity of the EV charger and at least a portion of the first constellation of GNSS satellites, and determining a relative position of the mobile device to the EV charger based on the second GNSS timestamped data and the first GNSS error data.

In some embodiments, the method may further include receiving second GNSS location data associated with a mobile device within proximity of the EV charger, wherein second GNSS location data was determined based on second GNSS timestamped data associated with the mobile device and at least a portion of the first constellation of GNSS satellites; and determining a relative position of the mobile device to the EV charger based on the second GNSS timestamped data and the first GNSS error data.

In some embodiments, the charging enabled parking space influenced media data may be used to offset costs associated with home-based EV charging.

In some embodiments, the charging enabled parking space influenced media data may further be based on user information. In further embodiments, the user information may include user survey information and/or user social networking information. In further embodiments, the user survey information may be requested during a user EV charger account registration by the user.

In some embodiments, the known location data may have an accuracy better than 50 centimeters. In further embodiments, the known location data may have an accuracy better than 20 centimeters. In still further embodiments, the known location data may have an accuracy better than 10 centimeters. In still further embodiments, the known location data may have an accuracy better than 5 centimeters. In still further embodiments, the known location data may have an accuracy better than 2 centimeters.

In another embodiment, an EV charger includes EV charging circuitry, a memory, and at least one processor. The at least one processor is configured for (1) receiving known location data associated a global position of the EV charger, (2) receiving first global navigation satellite system (GNSS) timestamped data associated with the EV charger from a first constellation of GNSS satellites, (3) determining first GNSS location data based on the first GNSS timestamped data, and (4) determining first GNSS error data based on the first GNSS location data and the known location data. The known location data has an accuracy better than 10 centimeters.

In another embodiment, a non-transitory computer-readable storage medium is disclosed. The non-transitory computer-readable storage medium stores instructions to be implemented on an EV charger including at least one processor. The instructions when executed by the at least one processor cause the EV charger to perform a method. The method includes (1) receiving known location data associated a global position of the EV charger, (2) receiving first global navigation satellite system (GNSS) timestamped data associated with the EV charger from a first constellation of GNSS satellites, (3) determining first GNSS location data based on the first GNSS timestamped data, and (4) determining first GNSS error data based on the first GNSS location data and the known location data. The known location data has an accuracy better than 10 centimeters.

In some embodiments, the known location data may have an accuracy better than 5 centimeters. In certain embodiments, the known location data may have an accuracy better than 2 centimeters.

According to another embodiment, a method is implemented on at least one computing device. The method includes detecting a presence of a user within a proximity of a home-based EV charger, determining charging enabled parking space influenced media data based on user information, and transmitting the charging enabled parking space influenced media data to at least one of a UI associated with the home-based EV charger and a UI associated with a mobile device.

In some embodiments, the mobile device may be an EV, a smart phone, a smart tablet, a smart watch, or the like associated with the user.

In some embodiments, the charging enabled parking space influenced media data may be used to offset costs associated with home-based EV charging.

In another embodiment, a computing device includes a memory and at least one processor. The at least one processor is configured for detecting a presence of a user within a proximity of a home-based EV charger, determining charging enabled parking space influenced media data based on user information, and transmitting the charging enabled parking space influenced media data to at least one of a UI associated with the home-based EV charger and a UI associated with a mobile device.

In another embodiment, a non-transitory computer-readable storage medium stores instructions to be implemented on at least one computing device. The at least one computing device includes at least one processor. The instructions when executed by the at least one processor cause the at least one computing device to perform a method. The method includes detecting a presence of a user within a proximity of a home-based EV charger, determining charging enabled parking space influenced media data based on user information, and transmitting the charging enabled parking space influenced media data to at least one of a UI associated with the home-based EV charger and a UI associated with a mobile device.

In another embodiment, a method is implemented on at least one computing device. The method includes determining a plurality of media items for simultaneous viewing on a user interface (UI) associated with a home-based EV charger. The method further includes transmitting the plurality of media items to the UI associated with the home-based EV charger.

In some embodiments, each media item of the plurality of media items may be associated with a distinct sponsor.

In some embodiments, a first media item of the plurality of media items may be a background for the UI associated with the home-based EV charger. In further embodiments, the background may be branded by a first sponsor.

In some embodiments, a second media item of the plurality of media items may be a widget for the UI associated with the home-based EV charger. In further embodiments, the widget may be branded by a second sponsor.

In some embodiments, the widget may be a clock based widget, a calendar based widget, a weather based widget, and/or the like. In other embodiments, the widget may be a countdown based widget. In further embodiments, the countdown based widget may be associated with a remaining charge time of an EV being charged by the home-based EV charger.

In some embodiments, the widget may be associated with a ranking of EV energy use associated with the user as compared with a plurality of other users. In some embodiments, the widget may also be associated with a carbon footprint of the user.

In some embodiments, the UI may be a touchpad display physically coupled with the EV charger. In further embodiments, the method may further include receiving a timestamp and a media identification associated with an interaction with a media item on the touchpad display.

In some embodiments, determining the plurality of media items for simultaneous viewing may be based on user survey information, user social networking information, user purchasing information, and/or the like.

In another embodiment, a computing device includes a memory and at least one processor. The at least one processor is configured for determining a plurality of media items for simultaneous viewing on a user interface (UI) associated with a home-based EV charger. The at least one processor is further configured for transmitting the plurality of media items to the UI associated with the home-based EV charger.

In another embodiment, a non-transitory computer-readable storage medium stores instructions to be implemented on at least one computing device. The at least one computing device includes at least one processor. The instructions when executed by the at least one processor cause the at least one computing device to perform a method. The method includes determining a plurality of media items for simultaneous viewing on a user interface (UI) associated with a home-based EV charger. The method further includes transmitting the plurality of media items to the UI associated with the home-based EV charger.

According to another embodiment, a method is implemented on at least one computing device. The method includes (1) determining a plurality of media items for possible simultaneous viewing on a user interface (UI) associated with a home-based electric vehicle (EV) charger, (2) providing representations of the plurality of media items to the UI, (3) receiving a selection representing a subset of the plurality of media items from the UI; and (4) transmitting the subset of the plurality of media items to the UI.

In some embodiments, determining the plurality of media items may be based on a profile of a user of the home-based EV charger. In certain embodiments, the profile may include user information provided by the user. In further embodiments, the user information may include user survey information. The user survey information may be requested during a user EV charger account registration by the user.

In still further embodiments, the user information may include user social networking information. For example, the user social networking information may be provided an Instagram® account, a YouTube® account, a Facebook® account, a Twitter® account, a TikTok® account, a Pinterest® account, a Snapchat® account, and/or the like.

In still further embodiments, the user information may include user professional networking information. For example, the user professional networking information may be provided by a LinkedIn® account, a Chamber of Commerce account, a SCORE® account, a Rotary Club account, and/or the like.

In still further embodiments, the user information may include user technical profession organization information. For example, the user technical profession organization information may be provided by an ACM® account, a Network Professional Association account, a CompTIA® account, an Association for Women in Computing account, an Association of Information Technology Professionals account, a National Society of Professional Engineers account, an American Association of Engineering Societies account, a Society of Women Engineers account, an International Engineering Consortium account, an IEEE® account, and/or the like.

In still further embodiments, the user information may include user purchasing information. For example, the user purchasing information may include user home ownership information and the user home ownership information may include a user physical address.

In some embodiments, each media item of the plurality of media items may be associated with a distinct sponsor.

In some embodiments, a first media item of the subset of the plurality of media items may be a background for the UI. In certain embodiments, the background may be branded by a first sponsor.

In some embodiments, a second media item of the plurality of media items may be a widget for the UI. In certain embodiments, the widget may be branded by a second sponsor.

In further embodiments, the widget may be a clock based widget.

In other embodiments, the widget may be a calendar based widget.

In still other embodiments, the widget may be a weather based widget.

In still other embodiments, the widget may be a countdown based widget. In further embodiments, the countdown based widget may be associated with a remaining charge time of an EV being charged by the home-based EV charger.

In still other embodiments, the widget may be associated with a ranking of EV energy use associated with a user as compared with a plurality of other users.

In still other embodiments, the widget may be associated with a carbon footprint of a user.

In some embodiments, the UI may include a touchpad display physically coupled with the EV charger and the touchpad display is configured to provide a graphical user interface (GUI).

In some embodiments, the method may further include receiving a timestamp and a media identification associated with an interaction with a media item on the touchpad display.

In some embodiments, the UI may be implemented within the home-based EV charger.

In another embodiment, a computing device includes a memory and at least one processor. The at least one processor is configured for (1) determining a plurality of media items for possible simultaneous viewing on a UI associated with a home-based electric EV charger, (2) providing representations of the plurality of media items to the UI, (3) receiving a selection representing a subset of the plurality of media items from the UI; and (4) transmitting the subset of the plurality of media items to the UI.

In another embodiment, a non-transitory computer-readable storage medium stores instructions to be implemented on at least one computing device. The at least one computing device includes at least one processor. The instructions when executed by the at least one processor cause the at least one computing device to perform a method. The method includes (1) determining a plurality of media items for possible simultaneous viewing on a UI associated with a home-based EV charger, (2) providing representations of the plurality of media items to the UI, (3) receiving a selection representing a subset of the plurality of media items from the UI; and (4) transmitting the subset of the plurality of media items to the UI.

According to another embodiment, a method is implemented on at least one computing device. The method includes (1) determining a plurality of media items for possible simultaneous viewing on a first UI implemented within a home-based EV charger, (2) providing representations of the plurality of media items to a second UI associated with a user of the home based EV charger, (3) receiving a selection representing a subset of the plurality of media items from the second UI; and (4) transmitting the subset of the plurality of media items to the first UI.

In some embodiments, the first UI may include a touchpad display physically coupled with the EV charger and the touchpad display may be configured to provide a first GUI.

In some embodiments, the second UI may be implemented within a smart phone, a tablet, a smart watch, a smart TV, a laptop, a personal computer or the like. In further embodiments, the second UI may be configured to provide a second GUI.

In another embodiment, a computing device includes a memory and at least one processor. The at least one processor is configured for (1) determining a plurality of media items for possible simultaneous viewing on a first UI implemented within a home-based EV charger, (2) providing representations of the plurality of media items to a second UI associated with a user of the home based EV charger, (3) receiving a selection representing a subset of the plurality of media items from the second UI; and (4) transmitting the subset of the plurality of media items to the first UI.

In another embodiment, a non-transitory computer-readable storage medium stores instructions to be implemented on at least one computing device. The at least one computing device includes at least one processor. The instructions when executed by the at least one processor cause the at least one computing device to perform a method. The method includes (1) determining a plurality of media items for possible simultaneous viewing on a first UI implemented within a home-based EV charger, (2) providing representations of the plurality of media items to a second UI associated with a user of the home based EV charger, (3) receiving a selection representing a subset of the plurality of media items from the second UI; and (4) transmitting the subset of the plurality of media items to the first UI.

In another embodiment, an EV charger includes (1) a processor, (2) a memory electrically coupled with the processor, (3) EV charging circuitry electrically coupled with the processor, (4) a network interface electrically coupled with the processor, and (5) a broadcast transmitter electrically coupled with the processor.

In some embodiments, the broadcast transmitter may be configured to provide an over-the-air (OTA) signal to a television. In further embodiments, the OTA signal is compliant to at least one version of an Advanced Television Systems Committee standard, a Digital Video Broadcast-Terrestrial (DVB-T) system standard, or the like.

In some embodiments, the EV charger may further include an antenna electrically coupled with an output of the broadcast transmitter. In further embodiments, the antenna may be a dipole antenna, a loop antenna, a log periodic antenna, a multi-bay reflective array antenna, or the like.

In some embodiments, the EV charger may further include a broadcast receiver and a tuner electrically coupled with the processor. In certain embodiments, the broadcast receiver and the tuner may be configured to determine channel spectrum availability for the broadcast transmitter. In certain embodiments, the EV charger may further include a display electrically coupled with the broadcast receiver and the tuner.

In some embodiments, the EV charger may be configured for receiving charging enabled parking space influenced media data over the network interface and transmitting at least a portion of the charging enabled parking space influenced media data via the broadcast transmitter.

In some embodiments, the portion of the charging enabled parking space influenced media data may be used to offset costs associated with home-based EV charging.

In some embodiments, the EV charger may further include transcoding circuitry electrically coupled between the processor and the broadcast transmitter, and the transcoding circuitry may be configured to transcode the charging enabled parking space influenced media data to provide the portion of the charging enabled parking space influenced media data.

In some embodiments, the network interface may be configured to receive the charging enabled parking space influenced media data over the Internet.

In another embodiment, a method is implemented on an EV charger having a broadcast transmitter and a network interface. The method includes (1) receiving charging enabled parking space influenced media data over the network interface and (2) transmitting at least a portion of the charging enabled parking space influenced media data.

In some embodiments, the portion of the charging enabled parking space influenced media data may be used to offset costs associated with home-based EV charging.

In some embodiments, the charging enabled parking space influenced media data may be determined based on user information.

In some embodiments, the user information may include user survey information.

In some embodiments, the user information may include user social networking information.

In some embodiments, the broadcast transmitter may be configured to provide an over-the-air (OTA) signal to a television.

In some embodiments, the method may further include determining channel spectrum availability using a broadcast receiver and tuner.

In some embodiments, the method may further include transcoding the charging enabled parking space influenced media data to provide the portion of the charging enabled parking space influenced media data.

In some embodiments, the charging enabled parking space influenced media data may be received over the Internet.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings:

FIG. 14A and FIG. 14B depict a flow diagram illustrating a participant selection and onboarding process in accordance with embodiments of the present disclosure.

DETAILED DESCRIPTION

Figure 1:
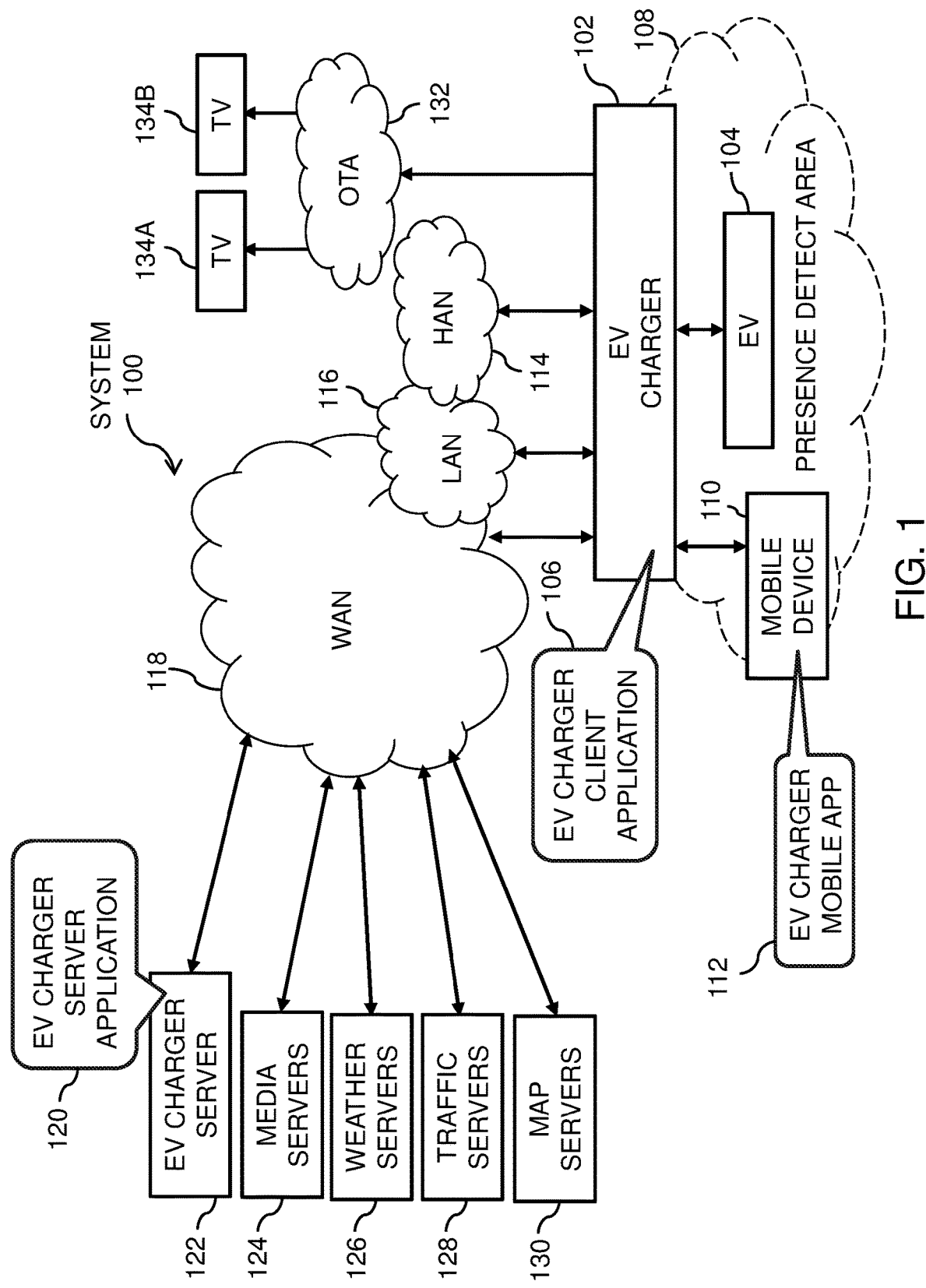
FIG. 1 depicts a block diagram illustrating a system that includes an electric vehicle (EV) charger server, an EV charger, and an EV, and a mobile device in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Disclosed herein are methods, systems, and devices for electric vehicle (EV) chargers for offsetting costs associated with home based electric vehicle (EV) charging.

FIG. 1 depicts a block diagram illustrating a system 100 that includes an electric vehicle (EV) charger 102 in accordance with embodiments of the present disclosure. The system also includes an EV 104, an EV charger client application 106. The EV charger 102 has a presence detect area 108 where a user and their mobile device 110 may be located during am EV charging session. The mobile device 110 may also include an EV charger application (app) 112. The system 100 may be configured to provide charging enabled parking space influenced media data via video and/or audio using the EV charger 102 and/or the mobile device 110. The charging enabled parking space influenced media data may be used to offset the cost of obtaining, installing, and/or operating the EV charger 102. The EV charger 102 may also be configured to communicate with one or more devices over a home area network (HAN), a local area network (LAN) 116, and/or a wide area network (WAN) 118.

An EV charger server application 120 executes on an EV charger sever 122. The EV charger server application 120 may determine the charging enabled parking space influenced media data to be provided by the EV charger 102 and/or the mobile device 110. Media servers 124, weather servers 126, traffic servers 128, and/or map servers 130 may directly or indirectly provide the charging enabled parking space influenced media data.

The EV charger 102 may also be able to broadcast at least a portion of the charging enabled parking space influenced media data over-the-air (OTA) to a plurality of televisions (TVs) such as TV 134A and TV 134B.

Figure 2:
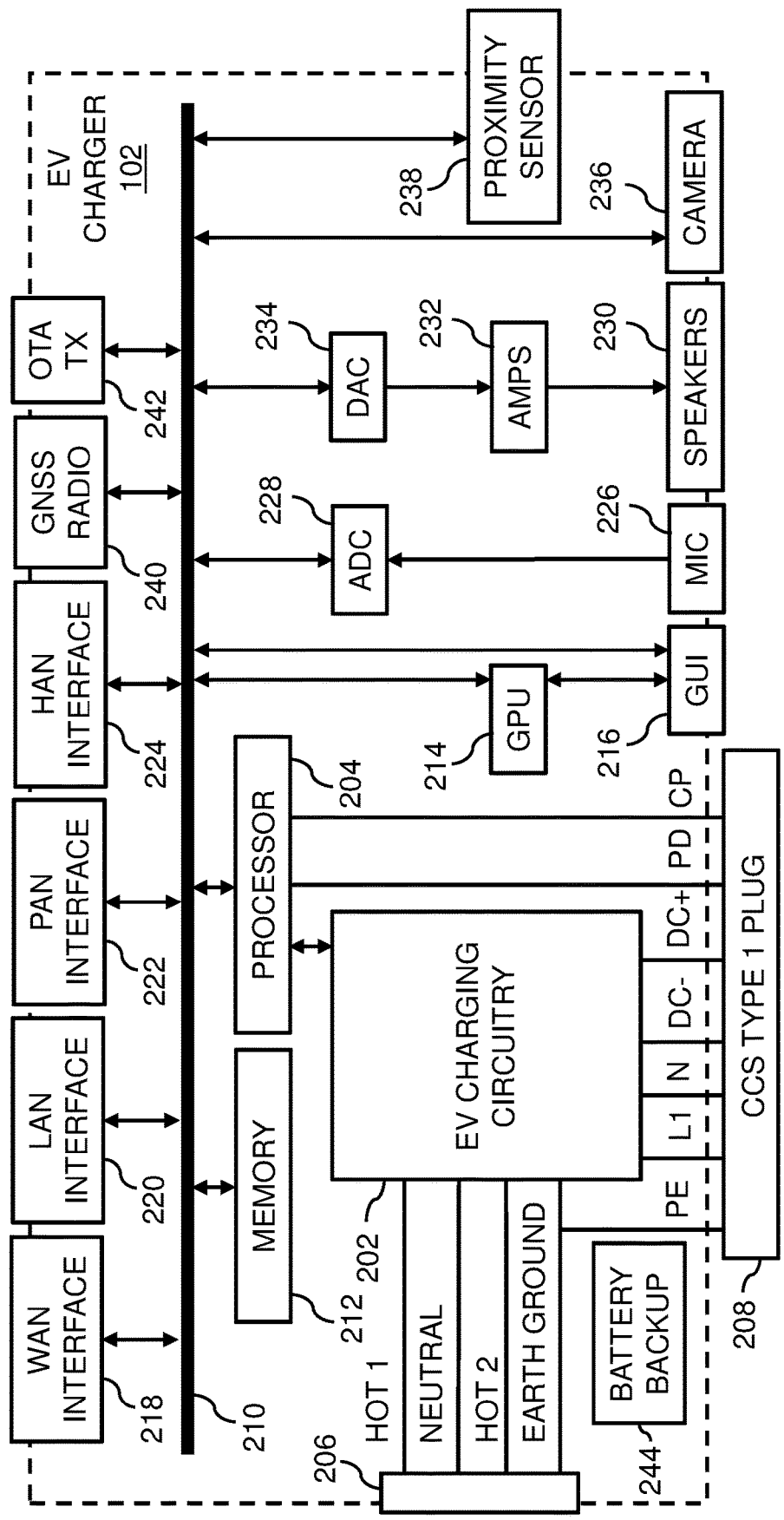
FIG. 2 depicts a block diagram further illustrating the EV charger of FIG. 1 in accordance with embodiments of the present disclosure.

FIG. 2 depicts a block diagram 200 further illustrating the EV charger 102 of FIG. 1 in accordance with embodiments of the present disclosure. The EV charger 102 includes EV charging circuitry 202 and a processor 204. The EV charger 102 also includes an electrical interface 206 for connecting to the local power grid. The electrical interface 206 includes electrical connections for Grid Hot 1, Grid Hot 2, Grid Neutral, and earth ground as a split-phase grid connection as is commonly known in the art.

The EV charger 102 also includes an electrical interface 208 for electrically coupling a charging cord for charging the EV 104 of FIG. 1. The electrical interface 208 may be compliant with a Combined Charging System (CCS) Type 1 connection.

The processor 204 is configured to monitor a Proximity Detection (PD) contact to confirm connection to the EV 104. The processor 204 is further configured to monitor a control pilot (CP) contact to maintain a charging rate within a safe operating limit of the EV 104. The EV charging circuitry 202 is configured to provide AC power to the electrical interface 208. The EV charging circuitry 202 includes switch circuitry for enabling and/or disabling AC power to the electrical interface 208 via a first AC (L1) contact and a second AC (N) contact. The L1 contact and the N contact provide AC power to internal charging circuitry within the EV 104. The switch circuitry may include a relay and the relay may be a solid state relay. The EV charging circuitry 202 may also include an AC-to-DC rectifier for providing DC power to the electrical interface 208 via a DC+contact and a DC-contact. The DC+contact and the DC-contact provide charging current to the battery pack of the EV 104 in this scenario.

An address/data bus 210 communicatively couples the processor 204 with a memory 212. In some embodiments, the memory 212 or a portion of the memory 212 may be integrated with the processor 204. The memory 212 may include a combination of volatile memory and non-volatile memory. In some embodiments the processor 204 and the memory 212 may be embedded in a microcontroller.

The address/data bus 210 also communicatively couples the processor 204 with a graphical processing unit (GPU) 214. The GPU 214 is communicatively coupled with a graphical user interface (GUI) 216 (e.g., a touch pad display).

The address/data bus 210 also communicatively couples the processor 204 with a WAN interface 218, a LAN interface 220, a personal area network (PAN) interface 222, and a HAN interface 224. The WAN interface 218 may be compliant with 2G, 3G, 4G, and/or 5G technologies networks including the Internet. The LAN interface 220 may include an Ethernet interface and/or wireless LAN interfaces such as Wi-Fi (e.g., 802.11a, 802.11b/g/n, and/or 802.11ac circuitry). The PAN interface 222 may be a Bluetooth® interface. The HAN interface may include a ZigBee® interface and/or a Z-wave® interface. The HAN interface 224 may also provide hub functionality for the HAN 114 of FIG. 1.

A microphone (MIC) 226 is communicatively coupled with the address/data bus 210 via an analog-to-digital converter (ADC) 228. The address/data bus 210 is also communicatively coupled with one or more speakers 230 via one or more amplifiers (amps) 232 and one or more digital-to-analog converters (DACs) 234.

The address/data bus 210 also communicatively couples the processor 204 with a camera 236 and a proximity sensor 238. The proximity sensor 238 may include an infrared sensor, a Doppler effect sensor, a sonar sensor, and/or the like. The proximity sensor 238 may be used to detect a presence of a user and/or the EV 104 within the presence detect area 108. The camera 236 may also be used to detect the presence of the user and/or the EV 104. In certain embodiments, the proximity sensor 238 and the camera 236 may be used simultaneously to increase the reliability of presence detection. One or more global navigation satellite system (GNSS) radios 240 also provide location data to the processor 204 via the address/data bus 210.

An OTA transmitter 242 is also communicatively coupled with processor 204 via the address/data bus 210. The OTA transmitter 242 may include transcoding circuitry for converting formats of the charging enabled parking space influenced media data. The OTA transmitter 242 may also include a broadcast receiver and a tuner for determining channel spectrum availability.

The EV charger 102 may also include a battery backup 244.

Figure 3:
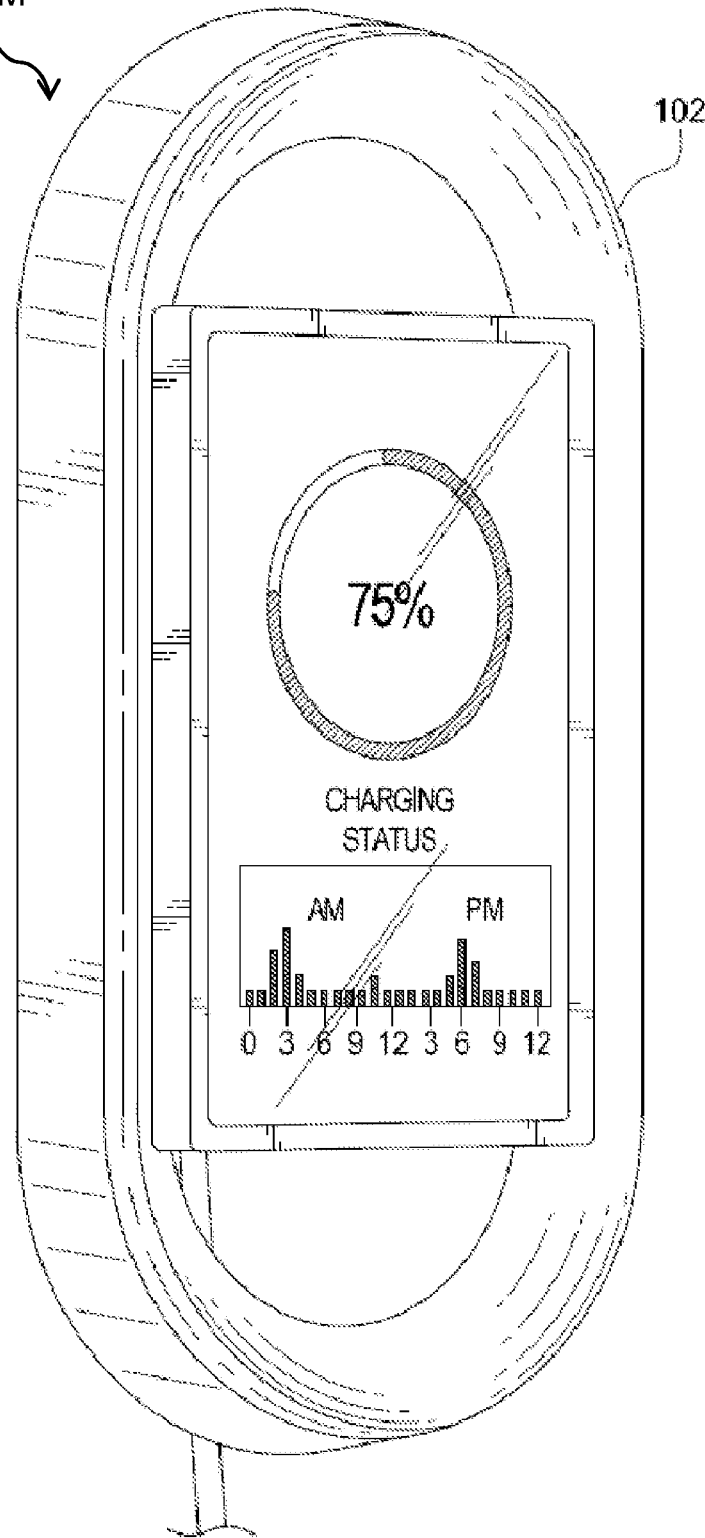
FIG. 3 depicts a mechanical diagram further illustrating the EV charger of FIG. 1 and FIG. 2 in accordance with embodiments of the present disclosure.

FIG. 3 depicts a mechanical diagram 300 further illustrating one embodiment of the EV charger 102 of FIG. 1 and FIG. 2 in accordance with embodiments of the present disclosure.

Figure 4:
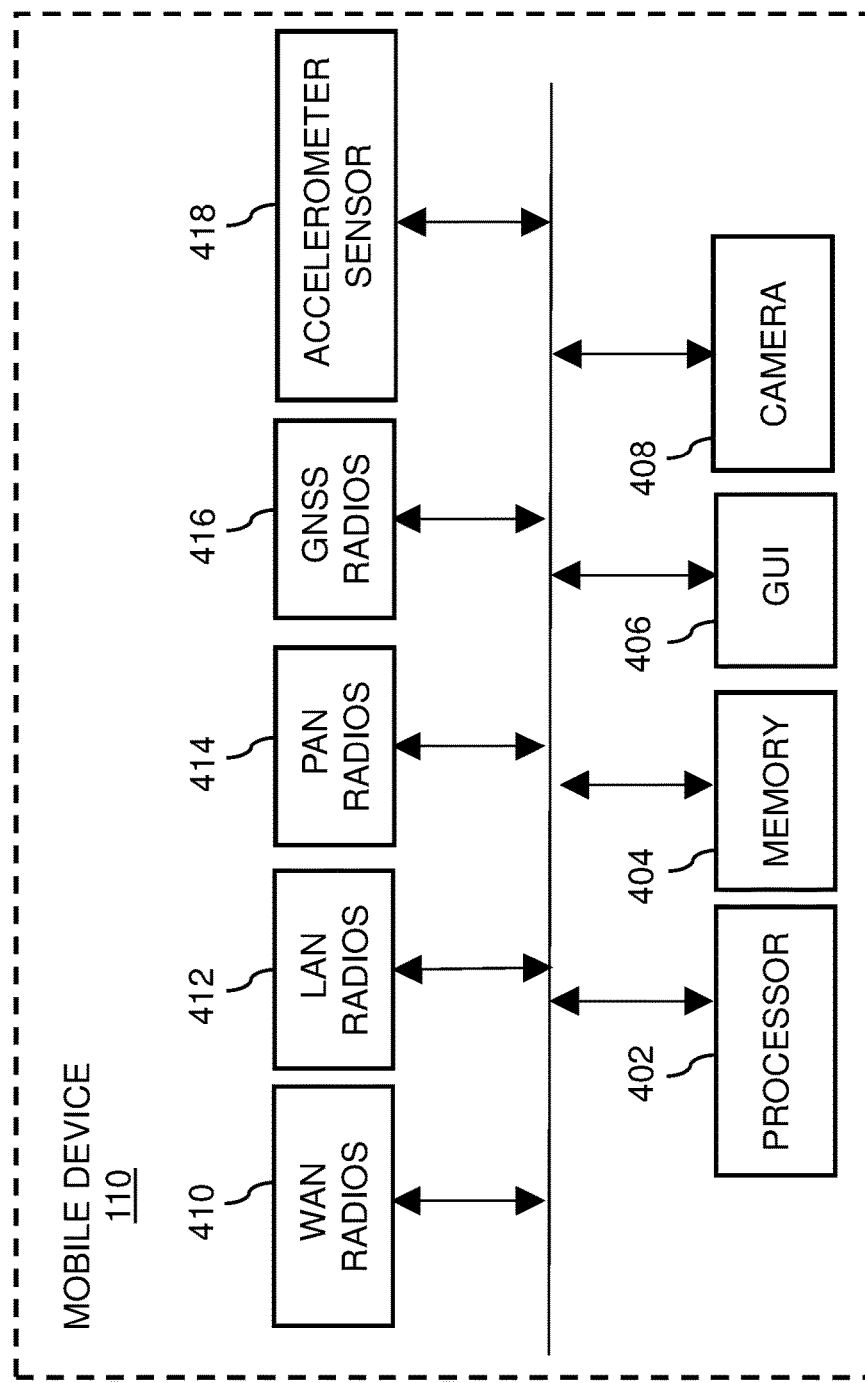
FIG. 4 depicts a block diagram further illustrating the mobile device of FIG. 1 in accordance with embodiments of the present disclosure.

FIG. 4 depicts a block diagram 400 further illustrating the mobile device 110 of FIG. 1 in accordance with embodiments of the present disclosure. The mobile device 110 may be a smart phone (e.g., cell phone), a tablet, a laptop, a smart watch, or the like. The mobile device includes a processor 402, a memory 404, a GUI 406, a camera 408, WAN radios 410, LAN radios 412, PAN radios 414, GNSS radios 416, and one or more accelerometer sensors 418.

In some embodiments the memory 404 or a portion of the memory 404 may be integrated with the processor 402. The memory 404 may include a combination of volatile memory (e.g., random access memory) and non-volatile memory (e.g., flash memory). In certain embodiments, the processor 402 may be a mobile processor such as the Qualcomm® Snapdragon® mobile processor. For example, the processor 402 may be the Snapdragon® 855 mobile processor. The GUI 406 and may be a touchpad display.

The WAN radios 410 may include 2G, 3G, 4G, and/or 5G technologies. The LAN radios 412 may include Wi-Fi technologies such as 802.11a, 802.11b/g/n, and/or 802.11ac circuitry. The PAN radios 414 may include Bluetooth® and/or BLE technologies.

Figure 5:
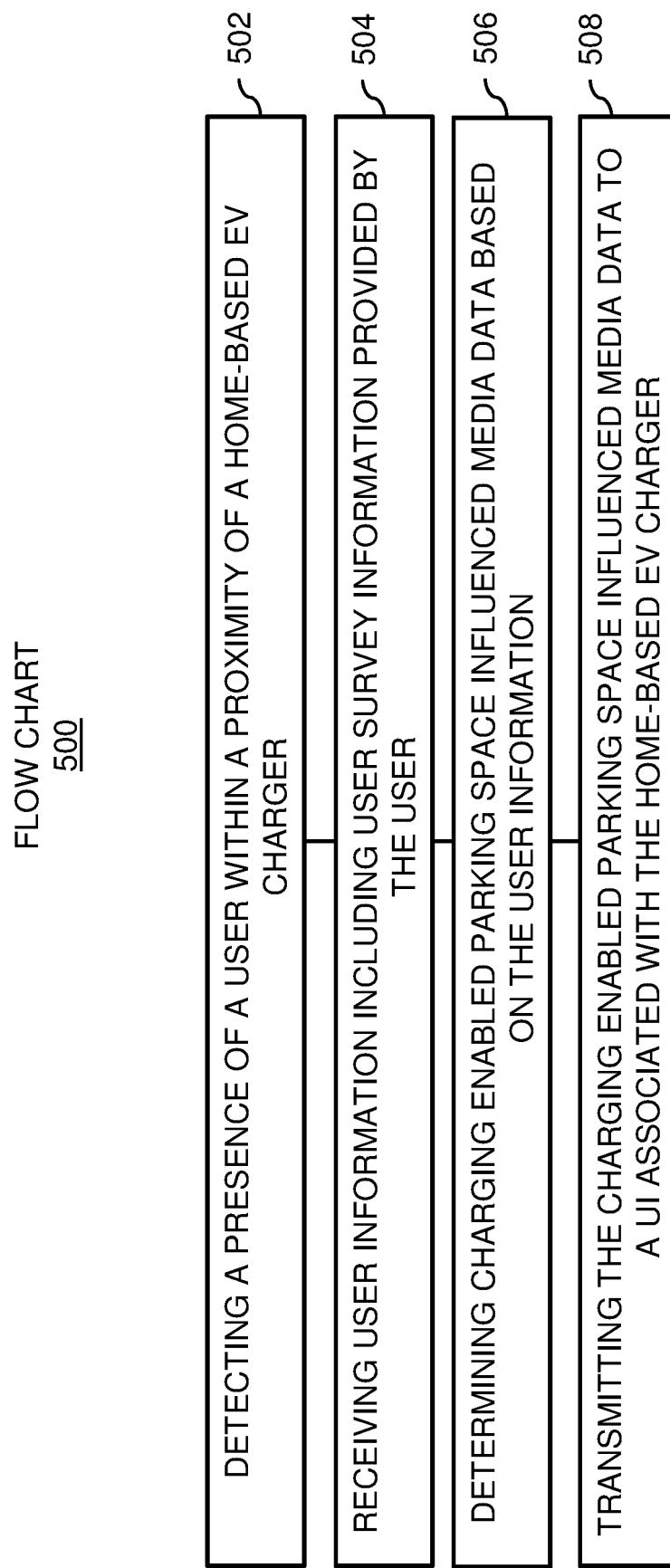
FIG. 5 depicts a flowchart illustrating a method for providing charging enabled parking space influenced media data based on user information including user survey information in accordance with embodiments of the present disclosure.

FIG. 5 depicts a flowchart 500 illustrating a method for providing charging enabled parking space influenced media data based on user information including user survey information in accordance with embodiments of the present disclosure.

In step 502, the method includes detecting a presence of a user within a proximity of a home-based EV charger.

In step 504, the method includes receiving user information including survey information provided by the user.

In step 506, the method includes determining charging enabled parking space influenced media data based on the user information.

In step 508, the method includes transmitting the charging enabled parking space influenced media data to a UI associated with the home-based EV charger.

Figure 6:
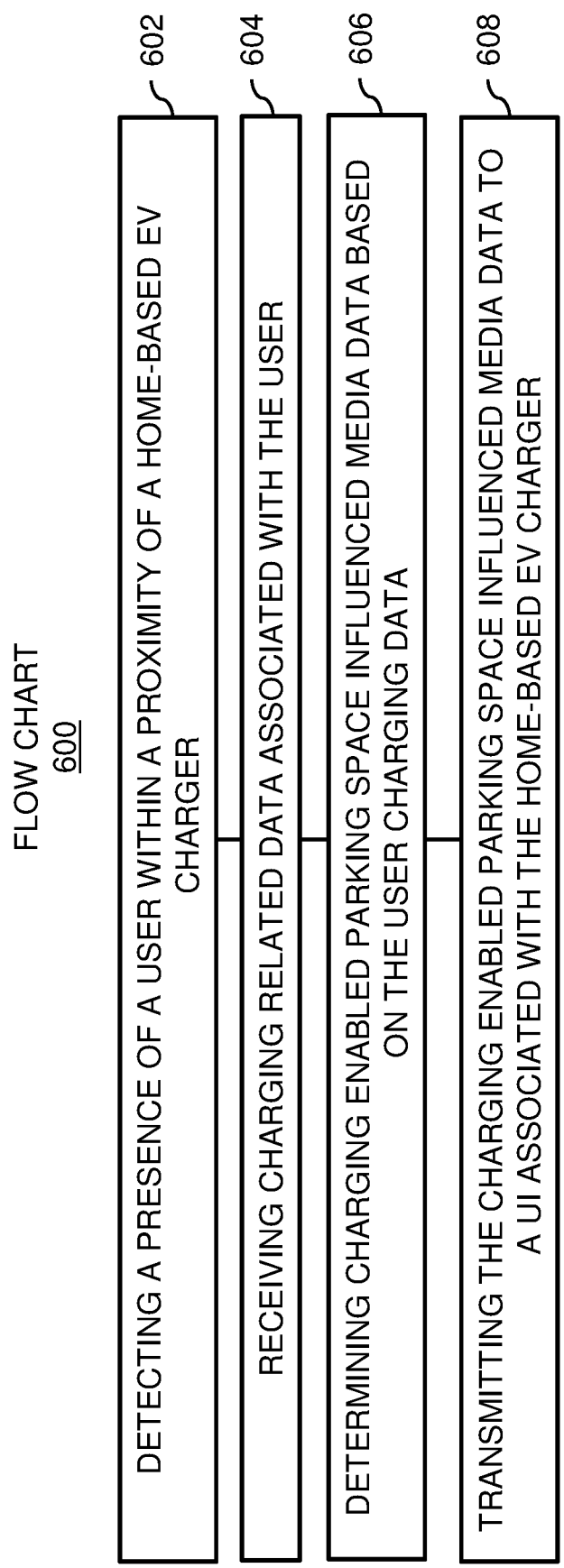
FIG. 6 depicts a flowchart illustrating a method for providing charging enabled parking space influenced media data based on charging related data associated with a user in accordance with embodiments of the present disclosure.

FIG. 6 depicts a flowchart 600 illustrating a method for providing charging enabled parking space influenced media data based on charging related data associated with a user in accordance with embodiments of the present disclosure.

In step 602, the method includes detecting a presence of a user within a proximity of a home-based EV charger.

In step 604, the method includes receiving charging related data associated with the user.

In step 606, the method includes determining charging enabled parking space influenced media data based on the user charging data.

In step 608, the method includes transmitting the charging enabled parking space influenced media data to a UI associated with the home-based EV charger.

Figure 7:
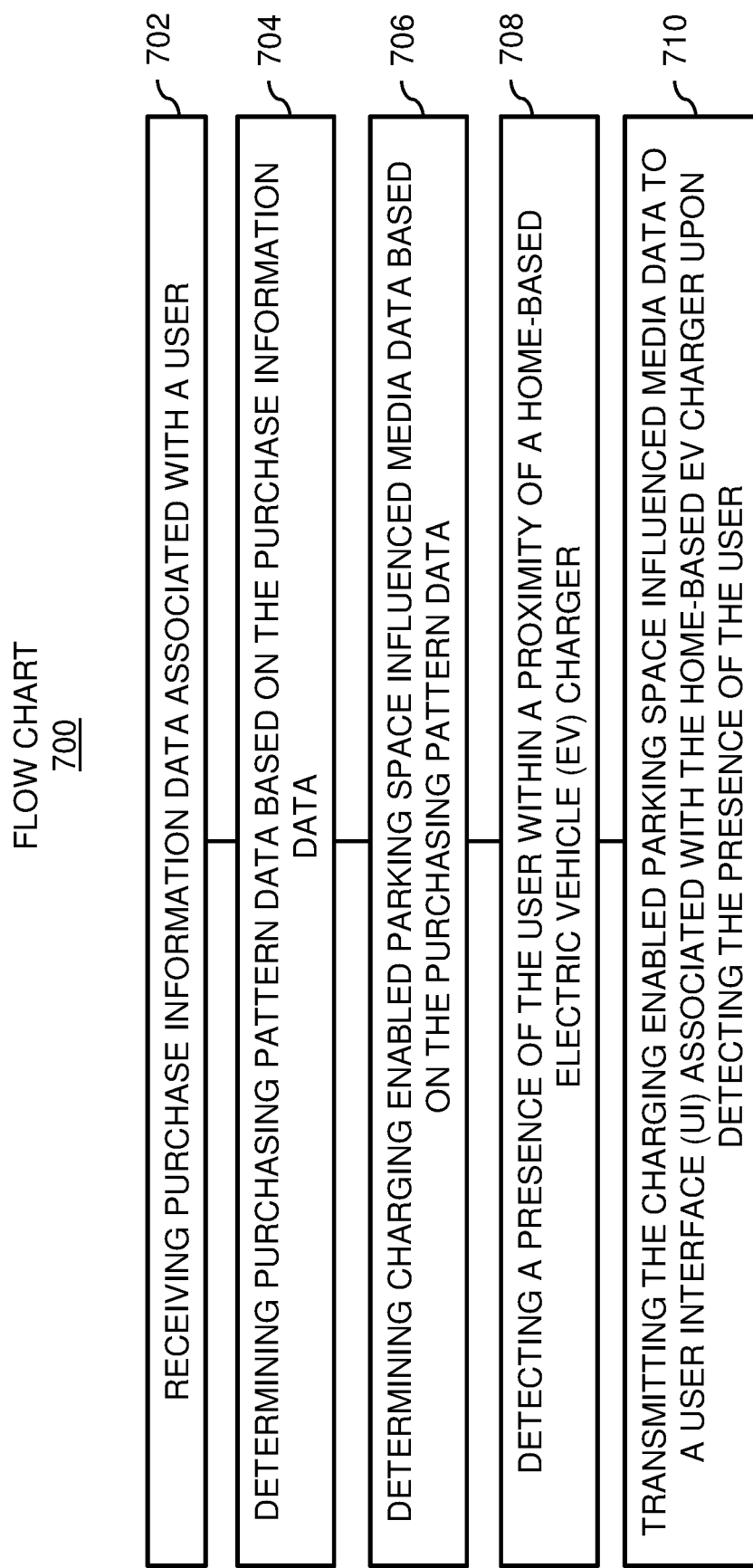
FIG. 7 depicts a flowchart illustrating a method for providing charging enabled parking space influenced media data based on purchasing pattern data in accordance with embodiments of the present disclosure.

FIG. 7 depicts a flowchart 700 illustrating a method for providing charging enabled parking space influenced media data based on purchasing pattern data in accordance with embodiments of the present disclosure.

In step 702, the method includes receiving purchase information data associated with a user.

In step 704, the method includes determining purchasing pattern data based on the purchase information data.

In step 706, the method includes determining charging enabled parking space influenced media data based on the purchasing pattern data.

In step 708, the method includes detecting a presence of the user within a proximity of a home-based EV charger.

In step 710, the method includes transmitting the charging enabled parking space influenced media data to a user interface (UI) associated with the home-based EV charger upon detecting the presence of the user.

Figure 8:
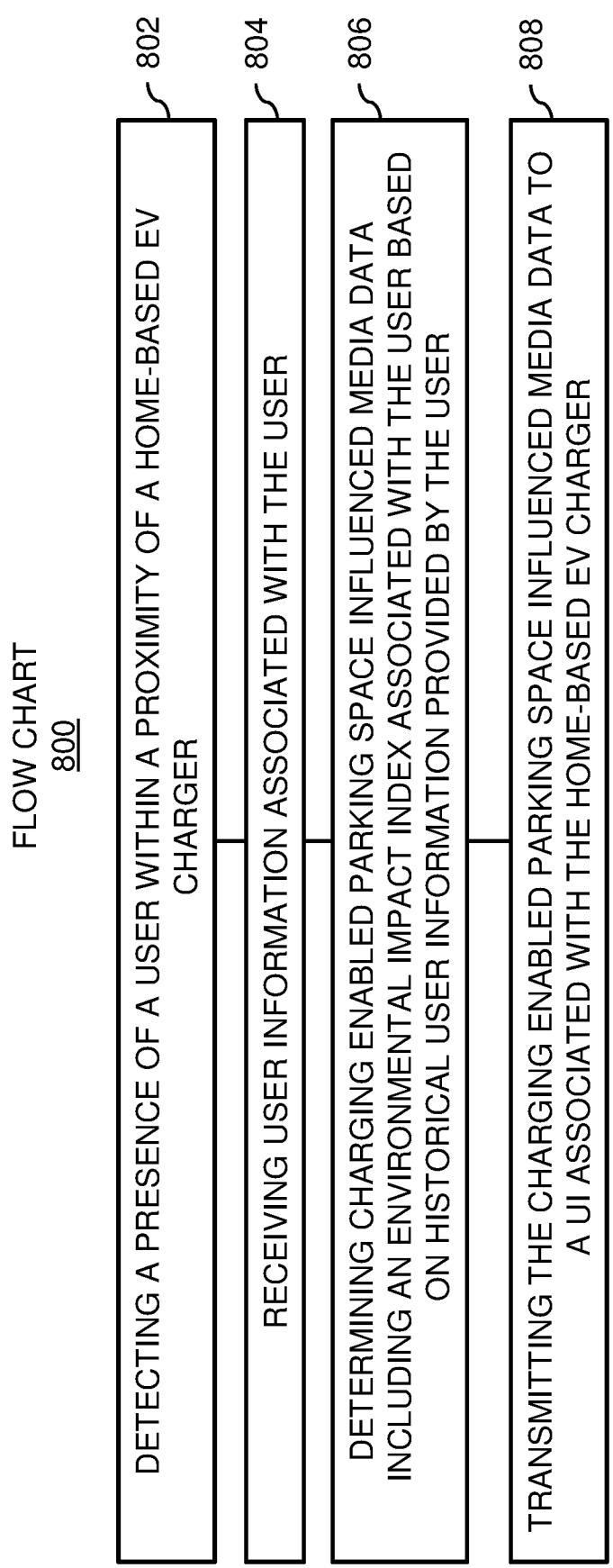
FIG. 8 depicts a flowchart illustrating a method for providing charging enabled parking space influenced media data including an environmental impact index associated with a user in accordance with embodiments of the present disclosure.

FIG. 8 depicts a flowchart 800 illustrating a method for providing charging enabled parking space influenced media data including an environmental impact index associated with a user in accordance with embodiments of the present disclosure.

In step 802, the method includes detecting a presence of a user within a proximity of a home-based EV charger In step 804, the method includes receiving user information associated with the user In step 806, the method includes determining charging enabled parking space influenced media data based on historical user information provided by the user.

In step 808, the method includes transmitting the charging enabled parking space influenced media data to a UI associated with the home-based EV charger. The charging enabled parking space influenced media data comprises an environmental impact index associated the user.

Figure 9:
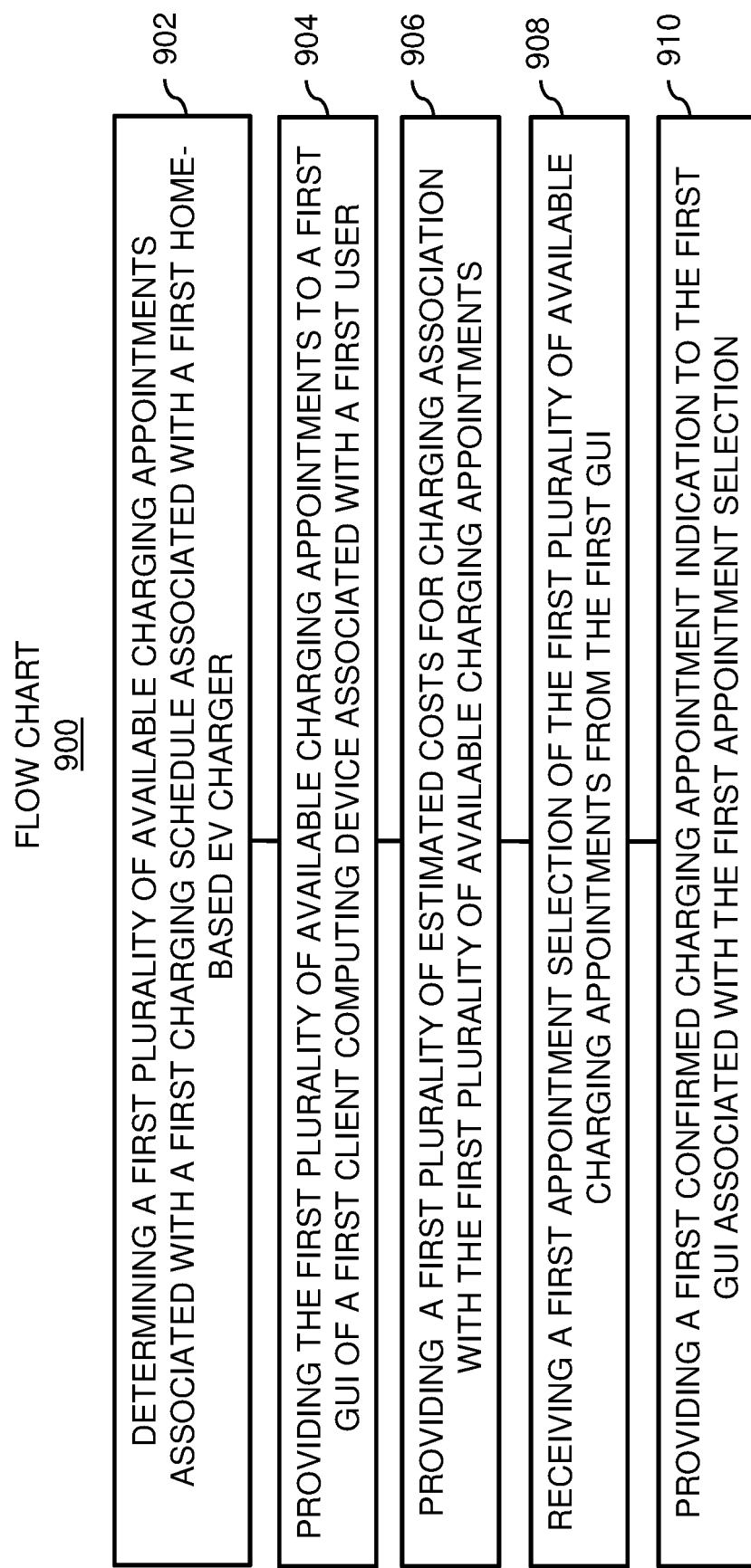
FIG. 9 depicts a flowchart illustrating a method for providing home based EV chargers to a plurality of users in accordance with embodiments of the present disclosure.

FIG. 9 depicts a flowchart 900 illustrating a method for providing home based EV chargers to a plurality of users in accordance with embodiments of the present disclosure.

In step 902, the method includes determining a first plurality of available charging appointments associated with a first charging schedule associated with a first home-based EV charger.

In step 904, the method includes providing the first plurality of available charging appointments to a GUI of a first client computing device associated with a first user.

In step 906, the method includes providing a first plurality of estimated costs for charging associated with the first plurality of available charging appointments.

In step 908, the method includes receiving a first appointment selection of the first plurality of available charging appointments from the first GUI.

In step 910, the method includes providing a first confirmed charging appointment indication to the first GUI associated with the first appointment selection.

Figure 10:
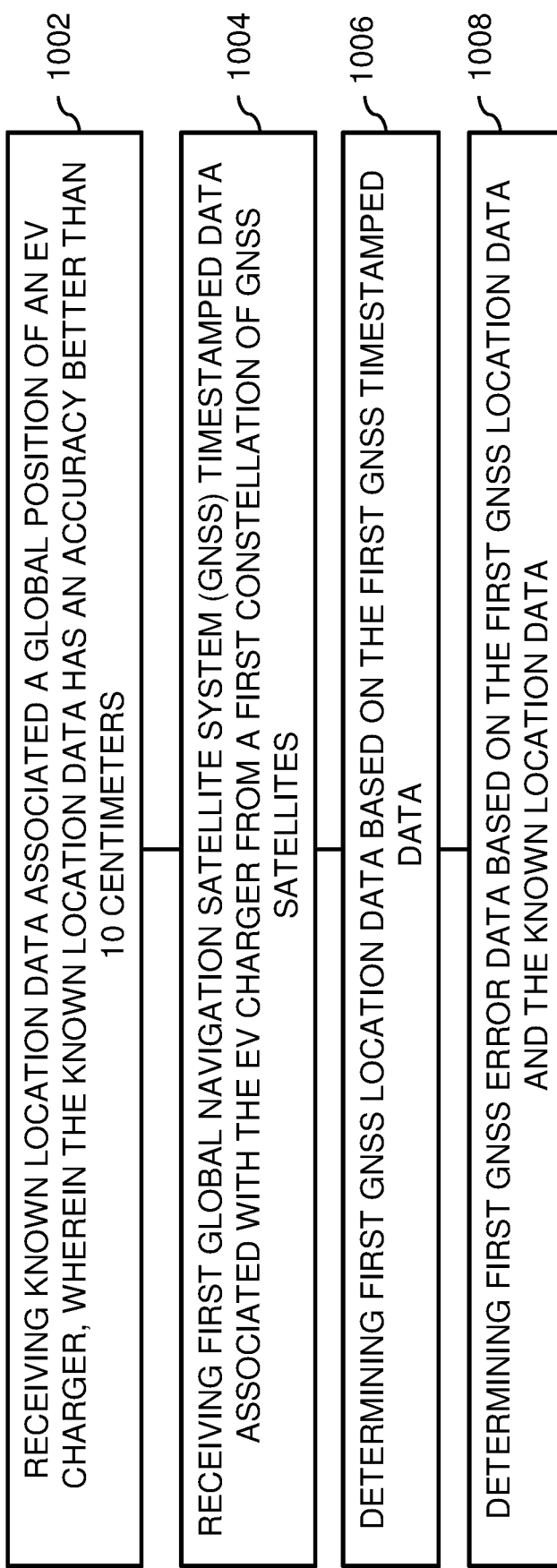
FIG. 10 depicts a flowchart illustrating a method for determining relative position of a mobile device to an EV charger in accordance with embodiments of the present disclosure.

FIG. 10 depicts a flowchart 1000 illustrating a method for determining relative position of a mobile device to an EV charger in accordance with embodiments of the present disclosure.

In step 1002, the method includes receiving known location data associated with a global position of the EV charger, wherein the known location data has an accuracy better than 10 centimeters.

In step 1004, the method includes receiving first GNSS timestamped data associated with the EV charger from a first constellation of GNSS satellites.

In step 1006, the method includes determining first GNSS location data based on the first GNSS timestamped data.

In step 1008, the method includes determining first GNSS error data based on the first GNSS location data and the known location data.

Figure 11:
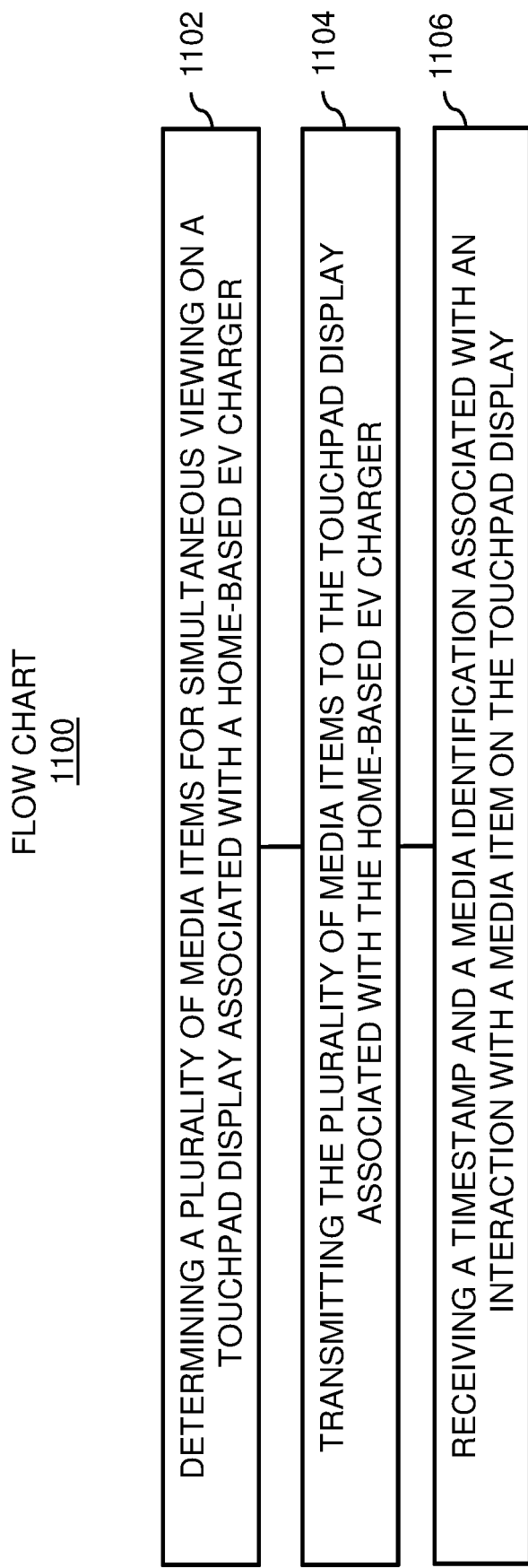
FIG. 11 depicts a flowchart illustrating a method for providing a plurality of media items to a user interface (i.e. a touchpad display) of a home based EV charger in accordance with embodiments of the present disclosure.

FIG. 11 depicts a flowchart 1100 illustrating a method for providing a plurality of media items to a user interface (e.g. a touchpad display) of a home-based EV charger in accordance with embodiments of the present disclosure.

In step 1102, the method includes determining the plurality of media items for simultaneous viewing on the user interface (UI) associated with a home-based EV charger. The plurality of media items may be associated with a distinct sponsor. At least one of the media items may be a background for the UI and branded by a sponsor. Another one of the media items may be a widget and the widget may be branded by a different sponsor.

In step 1104, the method includes transmitting the plurality of media items to the UI associated with the home-based EV charger. The UI may be a touchpad display and/or the like.

In step 1106, the method includes receiving a timestamp and a media identification associated with an interaction with a media item on the touchpad display. The timestamp and the media identification are data logged upon receiving.

Figure 12:
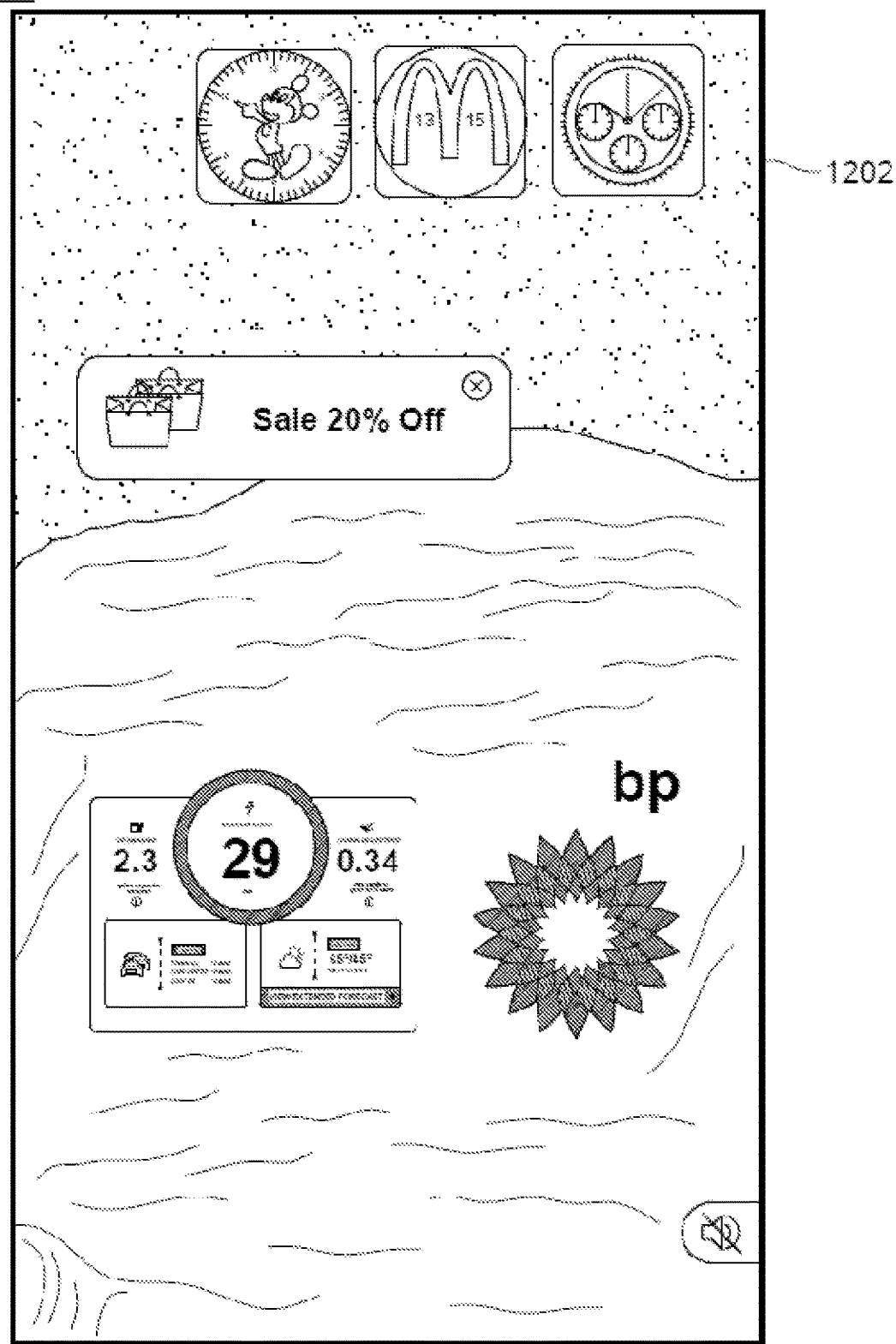
FIG. 12 depicts a diagram illustrating a graphical user interface (GUI) of the home based EV charger of FIG. 11 in accordance with embodiments of the present disclosure.

FIG. 12 depicts a diagram 1200 illustrating a GUI 1202 of the home based EV charger in accordance with embodiments of the present disclosure. The GUI 1202 includes a plurality of media items as described with FIG. 11. At least some of the media items are widgets. For example the widgets may be clock based widgets, calendar based widgets, weather based widgets, and/or the like. The widgets may also include countdown based widgets and/or carbon footprint widgets associated with the user and/or home-based EV charger.

Figure 13:
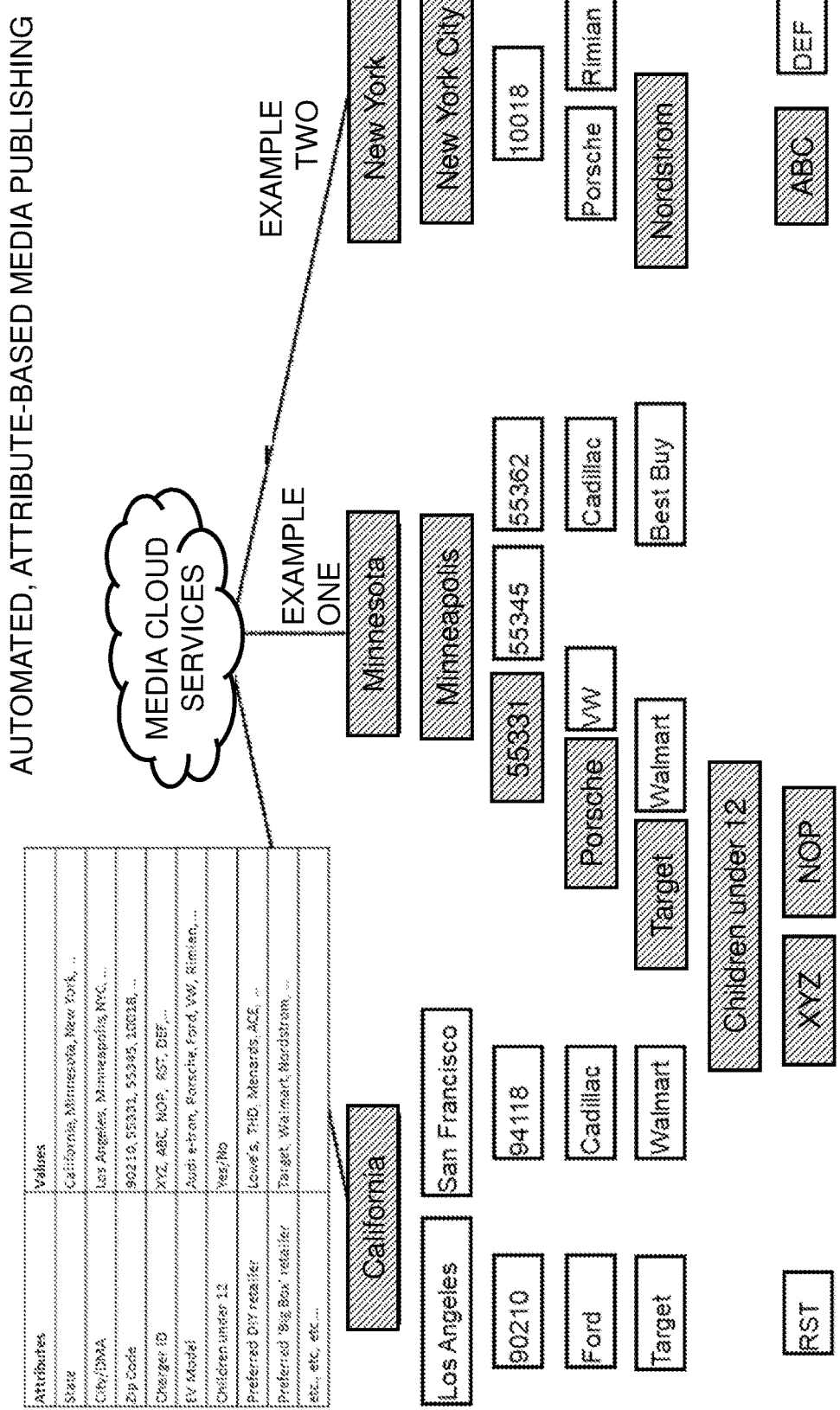
FIG. 13 depicts a diagram illustrating automated attribute-based media publishing for home-based EV chargers in accordance with embodiments of the present disclosure

FIG. 13 depicts a diagram 1300 illustrating automated attribute-based media publishing for home-based EV chargers in accordance with embodiments of the present disclosure. Unique media assets (e.g. media items) are automatically published to home-based EV chargers wherein the attributes of the home-based EV charger and/or attributes of a user of the home-based EV charge match the media publishing attributes. Attributes may include state, city, zip code, EV charger IDs, EV model numbers, and/or the like.

In example one, publish Disney® themed clock widget to all EV community members that live in zip code 55331, drive a Porsche, shot at Target, and have children under 12. Evee units XYZ and NOP meet criteria.

In example two, publish Rolex-themed clock widget to all EV community members that live in New York City and shop at Nordstrom® department store. EV charger unit ABC meets the criteria.

Figure 14A:
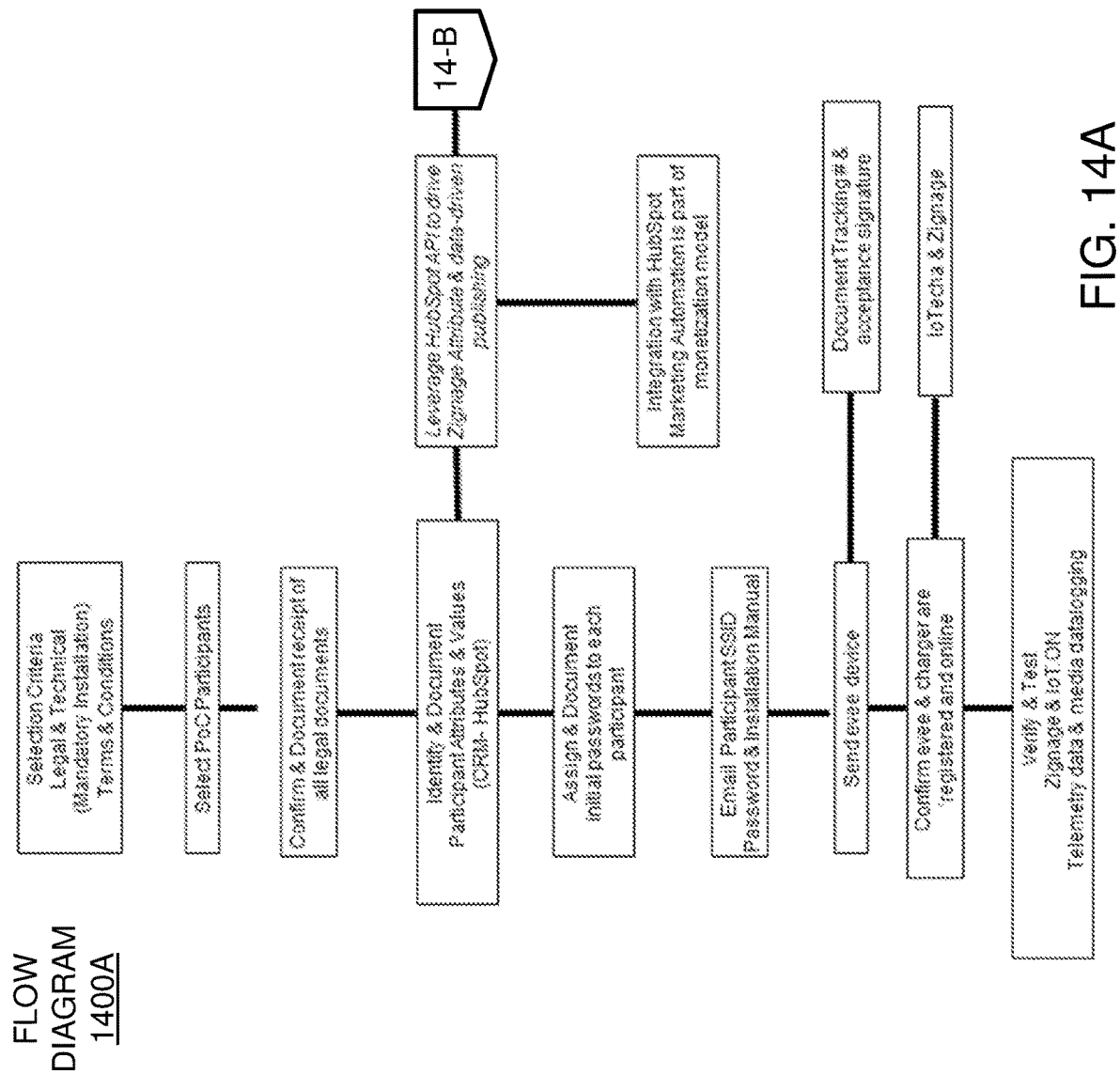

FIG. 14A and FIG. 14B depict a flow diagram 1400A/B illustrating one embodiment a participant selection and onboarding process for users and home-based EV chargers in accordance with embodiments of the present disclosure. Attributes are collected during the onboarding to support the automated publishing as described with FIG. 13. New attributes are continually identified and their values are collected over time based upon ongoing data collection and surveys.

The flow diagram 1400A/B includes selection criteria for legal and technical items (e.g., mandatory installation terms and conditions); selection of point of contact (PoC) participants; confirmation and documentation receipt of all legal documents; identification and documentation of participant attributes and values; assignment and documentation of initial passwords to each participant; emailing participant Service Set Identifier (SSID) password and installation manual, sending (i.e. shipping) EV charger; confirming EV charger is registered and online; and verifying and testing of the EV charger.

Figure 15:
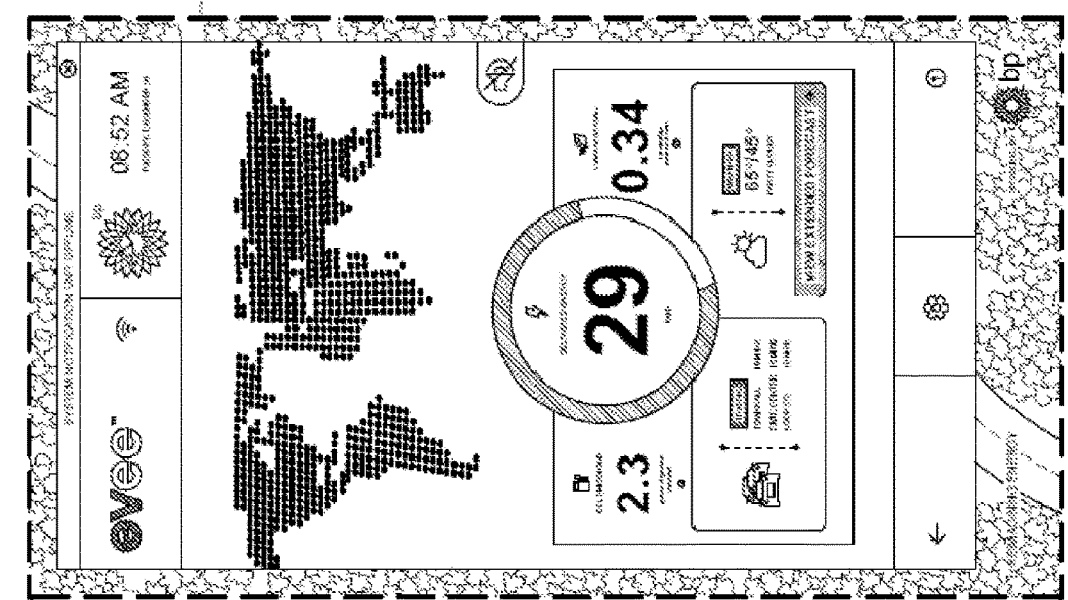
FIG. 15 depicts a diagram illustrating a home based EV charger having a GUI depicting a plurality of widgets in accordance with embodiments of the present disclosure.
Figure 15:
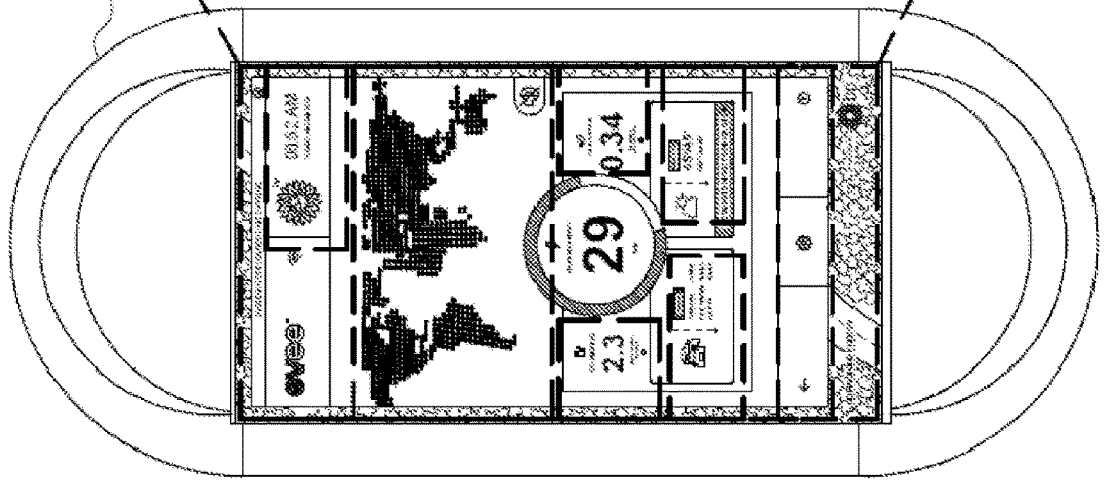

In another embodiment, FIG. 15 depicts a diagram 1500 illustrating a home based EV charger 1502 having a GUI 1504 depicting a plurality of widgets in accordance with embodiments of the present disclosure. Each widget is independently highlighted on the left and enlarged for detail on the right. In this scenario, the consumer chooses a brand visual or an associated likeness attached to advertising pertaining to a consumer's profile. As an example, Rolex® may pay a central entity, subsidizing the home based EV charger 1502, $1 for every day a user keeps the Rolex® watch widget as their clock on the EV's screen. To initiate, the central entity may provide a plurality of watch widgets to the user based on a user's profile. The central entity may suggest a Disney® watch, a Fitbit® watch, an Apple® watch, and the Rolex® watch. But the user ultimately selects the Rolex® watch. The central entity receives a $1/day from Rolex® and Rolex® receives valuable user information that may be used for further advertising or may be further sold to Rolex® partners. In some embodiments, the central entity may receive more or less a $1/day from the advertiser.

This embodiment provides a unique customer experience to be valued and trusted by the user as non-invasive, invited, and accepted into their home via the home based EV charger 1502. This embodiment provides a content strategy that drives eco-conscious behavioral modification by engaging the user. The embodiment is further built on a foundational business model including data personalization and localization with recurring revenue via widget sponsorships. The embodiment includes advertising/promotion, customer acquisition, energy demand response services, e-commerce transactions, loyalty program(s), portfolio data monetization, social media sponsorship, targeted email usage, application integration/subscription, and a personalized and localized customer experience.

Targeted content is provided to the user on the EV's display. On screen layout may be programmatically changed or modified by the user and/or the central entity. Every 'zone' on the EV's display may be independently programmed. Every 'zone' may also be independently monetized through sponsorships and/or advertising. Every 'zone' may also be 'touched' by the user to reveal additional information. All publishing and 'touch' interaction is data logged (e.g. HubSpot-CRM). Widgets may include time, weather, etc. Additionally, a background may have a sponsorship opportunity via user selection.

Figure 16:
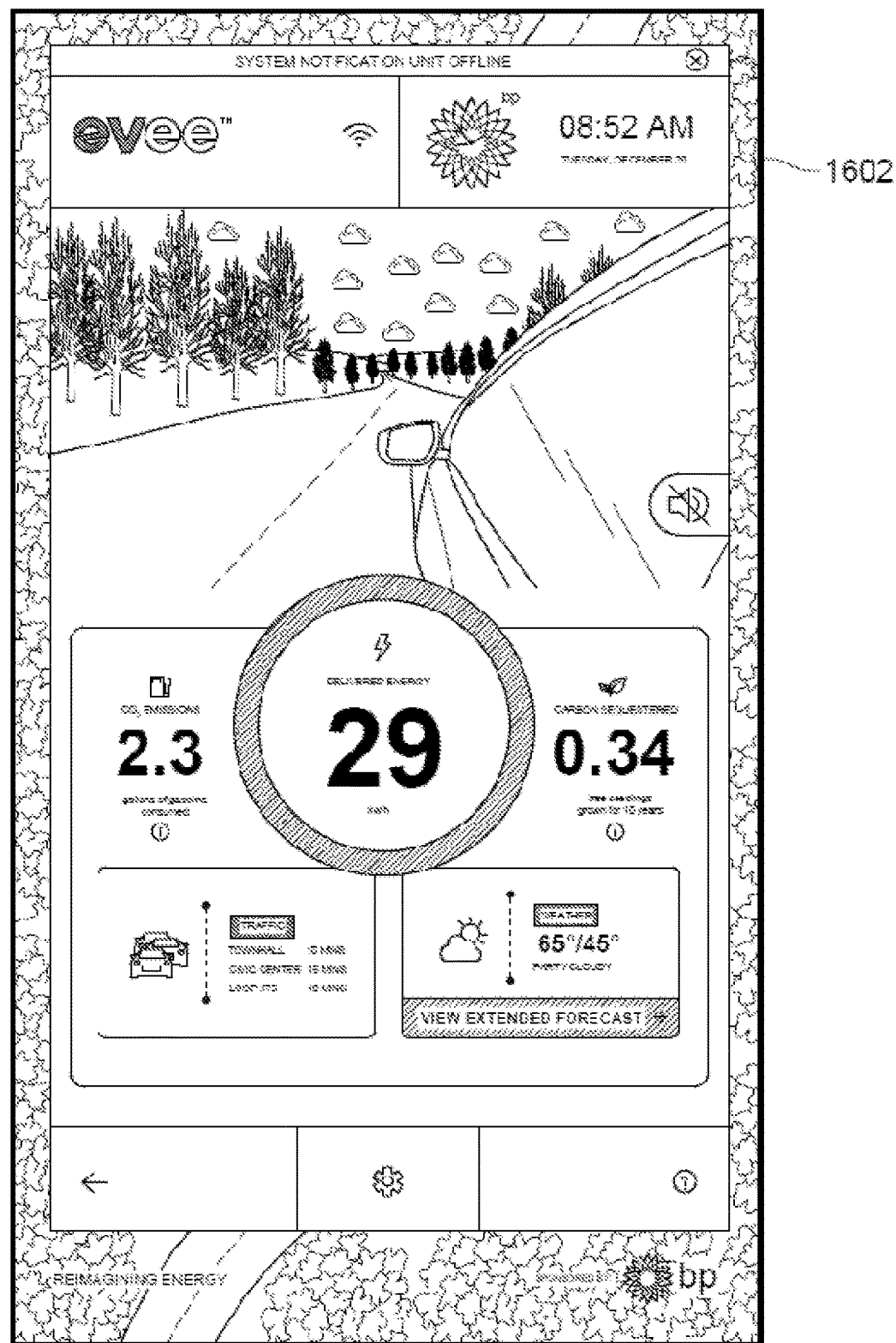
FIG. 16 depicts a diagram illustrating another GUI that may be provided by the home based EV charger of FIG. 15 in accordance with embodiments of the present disclosure.

FIG. 16 depicts a diagram 1600 illustrating another GUI 1602 that may be provided by the home based EV charger 1502 of FIG. 15 in accordance with embodiments of the present disclosure.

Figure 17:
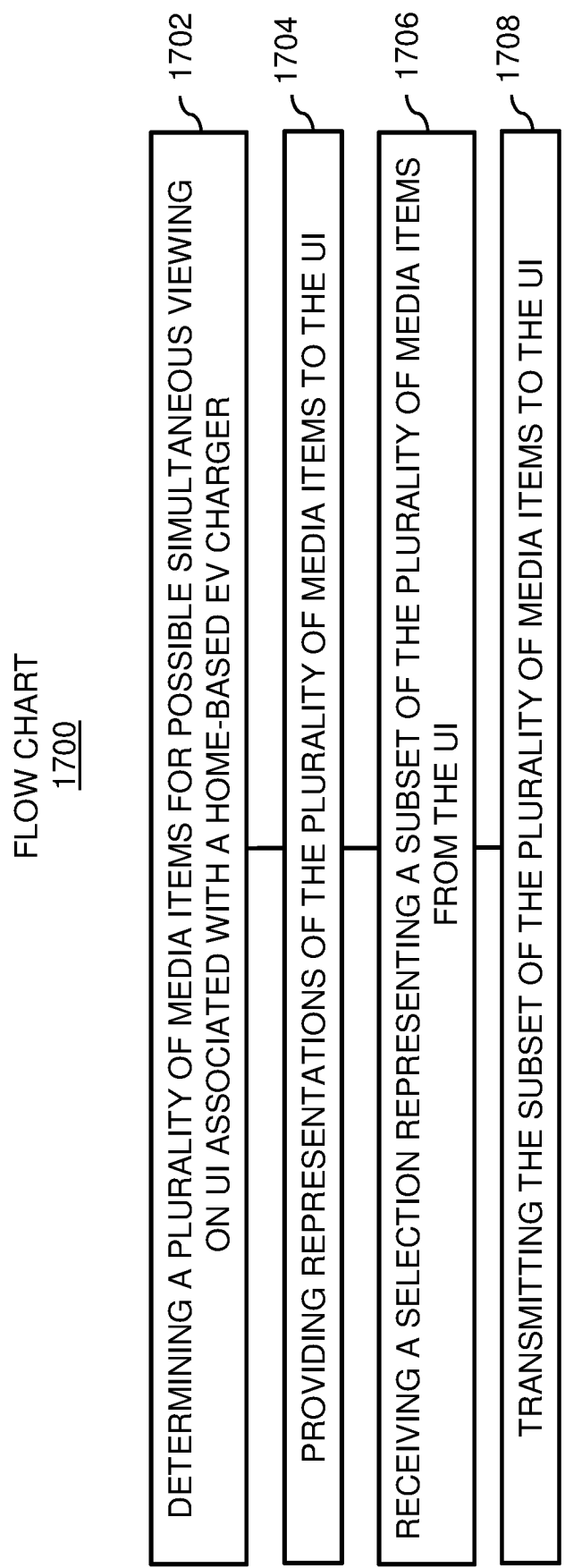
FIG. 17 depicts a flowchart illustrating a method for providing a GUI to a home based EV charger in accordance with embodiments of the present disclosure.

FIG. 17 depicts a flowchart 1700 illustrating a method for providing a GUI to a home based EV charger in accordance with embodiments of the present disclosure.

In step 1702, the method includes determining a plurality of media items for possible simultaneous viewing on a UI associated with a home-based EV charger.

Determining the plurality of media items may be based on a profile of the user. Additionally, artificial intelligence (AI) may be used. For example machine learning and/or deep learning may be used in determining the plurality of media items. The profile may include user information provided by the user. The user information may include user survey information. The user survey information may be requested during a user EV charger account registration by the user. The user information may also include user social networking information. The user social networking information may be provided an Instagram® account, a YouTube® account, a Facebook® account, a Twitter® account, a Tik-Tok® account, a Pinterest® account, a Snapchat® account, and/or the like. The user information may also include user professional networking information. The user professional networking information may be provided by a LinkedIn® account, a Chamber of Commerce account, a SCORE® account, a Rotary Club account, and/or the like. The user information may also include user technical profession organization information. The user technical profession organization information may be provided by an ACM® account, a Network Professional Association account, a CompTIA® account, an Association for Women in Computing account, an Association of Information Technology Professionals account, a National Society of Professional Engineers account, an American Association of Engineering Societies account, a Society of Women Engineers account, an International Engineering Consortium account, an IEEE® account, and/or the like. The user information may include also user purchasing information. The user purchasing information may include user home ownership information and the user home ownership information may include a user physical address.

Each media item of the plurality of media items may be associated with a distinct sponsor. A first media item of the subset of the plurality of media items may be a background for the UI. The background may be branded by a first sponsor. A second media item of the plurality of media items may be a widget for the UI. The widget may be branded by a second sponsor. The widget may be a clock based widget. A calendar based widget, a weather based widget, a countdown based widget, and/or the like. The countdown based widget may be associated with a remaining charge time of an EV being charged by the home-based EV charger. The widget may be associated with a ranking of EV energy use associated with a user as compared with a plurality of other users. The widget may also be associated with a carbon footprint of a user.

In step 1704, the method further includes providing representations of the plurality of media items to the UI.

In step 1706, the method further includes receiving a selection representing a subset of the plurality of media items from the UI.

In step 1708, the method further includes transmitting the subset of the plurality of media items to the UI.

Figure 18:
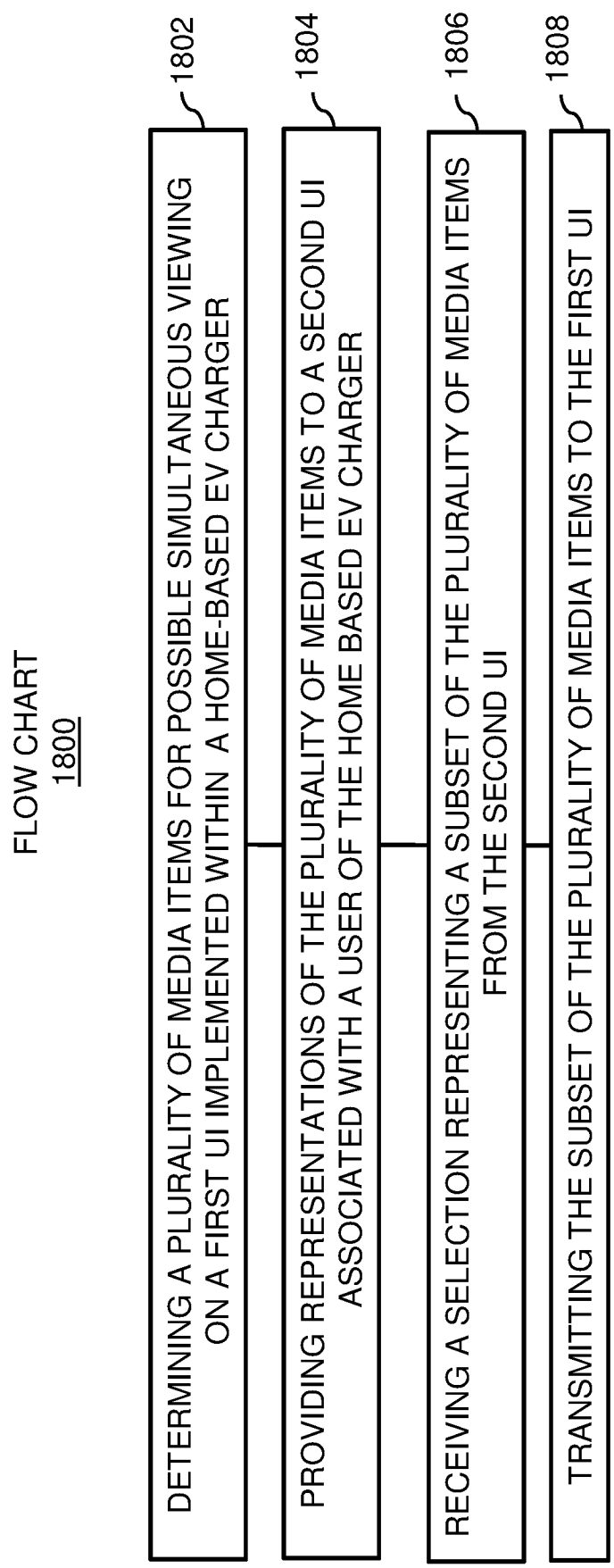
FIG. 18 depicts a flowchart illustrating another method for providing a GUI to a home based EV charger in accordance with embodiments of the present disclosure.

FIG. 18 depicts a flowchart 1800 illustrating another method for providing a GUI to a home based EV charger in accordance with embodiments of the present disclosure.

In step 1802, the method includes determining a plurality of media items for possible simultaneous viewing on a first UI implemented within a home-based EV charger. Determining the plurality of media items may be based on a profile of the user. Additionally, artificial intelligence (AI) may be used. For example machine learning and/or deep learning may be used in determining the plurality of media items. The profile may be similar to the profile described in step 1702 of FIG. 17. The plurality of media items may include a background and one or more widgets as also described in step 1702 of FIG. 17.

In step 1804, the method further includes providing representations of the plurality of media items to a second UI associated with a user of the home based EV charger.

In step 1808, the method further includes receiving a selection representing a subset of the plurality of media items from the second UI.

In step 1808, the method further includes transmitting the subset of the plurality of media items to the first UI.

Figure 19:
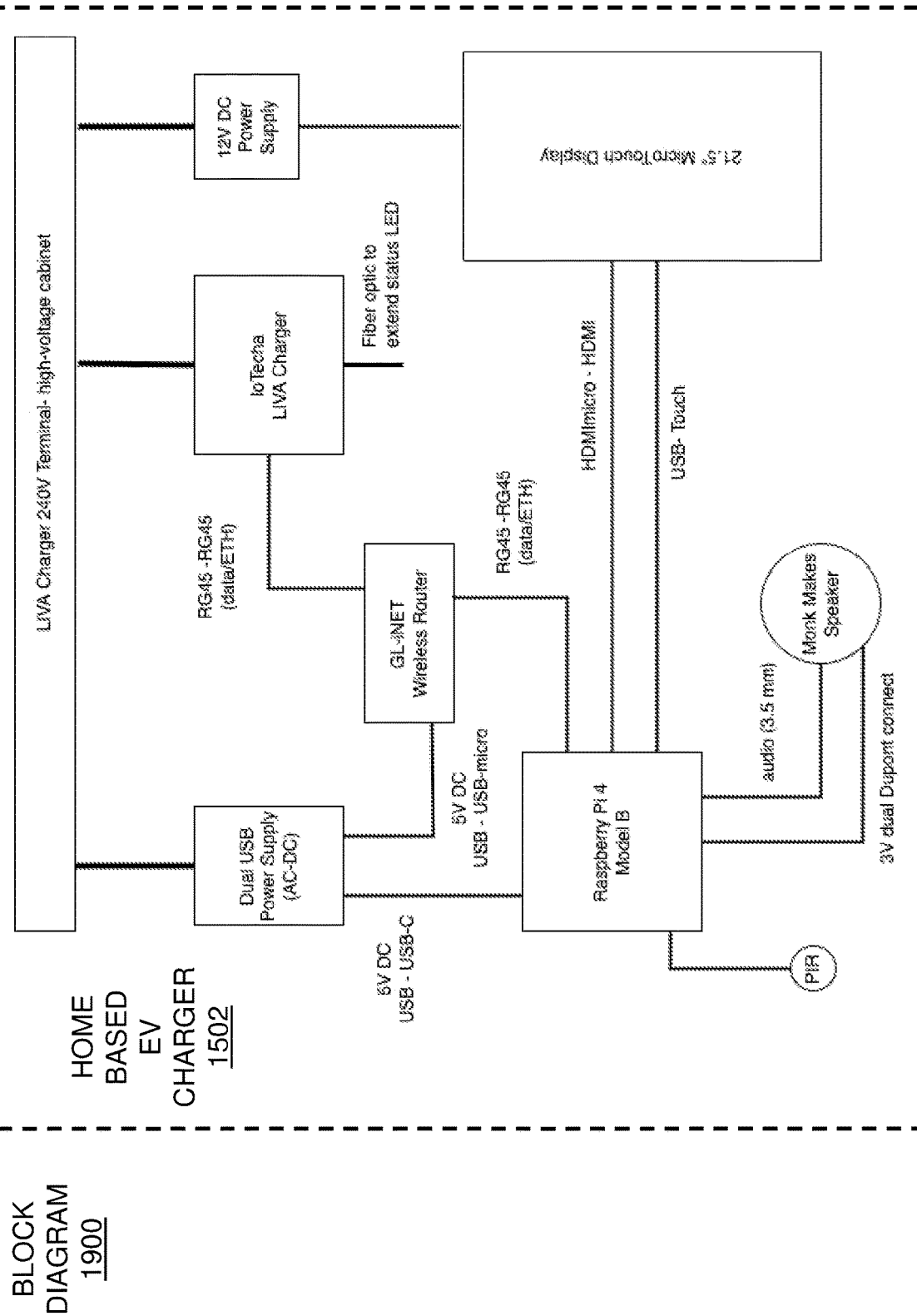
FIG. 19 depicts a block diagram illustrating the home based EV charger of FIG. 15 in accordance with embodiments of the present disclosure.

FIG. 19 depicts a block diagram 1900 illustrating the home based EV charger 1502 of FIG. 15 in accordance with embodiments of the present disclosure. The home based EV charger 1502 is configured to provide automated attribute-based media publishing and operate as an IoT device.

The home based EV charger 1502 includes a Raspberry Pi® computer, a wireless router (802.11), 21.5 inch diagonal touchscreen display, an AC-to-DC dual USB power supply, a 12 AC-DC power supply, a MonkMakes® speaker, an IoTecha LIVA™ EV charger, and a motion sensor (not shown in FIG. 19). The home based EV charger 1502 also includes a Raspberry Pi OS operating system (OS) with ZCast® asset/media management and media player. The home based EV charger 1502 is configured for remote updating capabilities and is SOC 2 compliant.

The home based EV charger 1502 is configured to display a plurality of widgets (e.g. GUI 1504 of FIG. 15 and GUI 1602 of FIG. 16). The plurality of widgets is optimized using Zignage zCast software, and is fully operational, programmable, with complete data logging.

The home based EV charger 1502 is further configured for publishing and touch events. For example, when the motion sensor detects a human presence one or more events may be triggered. The event may time out after a fixed time (e.g. 30 seconds) when the human presence is no longer detected. All 'events' and published media within each event are time stamped and data logged. For example, logged data may be exported as .csv files.

When the home based EV charger 1502 first powers up, a user may be required to connect to a local Wi-Fi access point and the complete a customer registration. After that, the home based EV charger 1502 displays the plurality of widgets and follows motion sensor rules.

Figure 20:
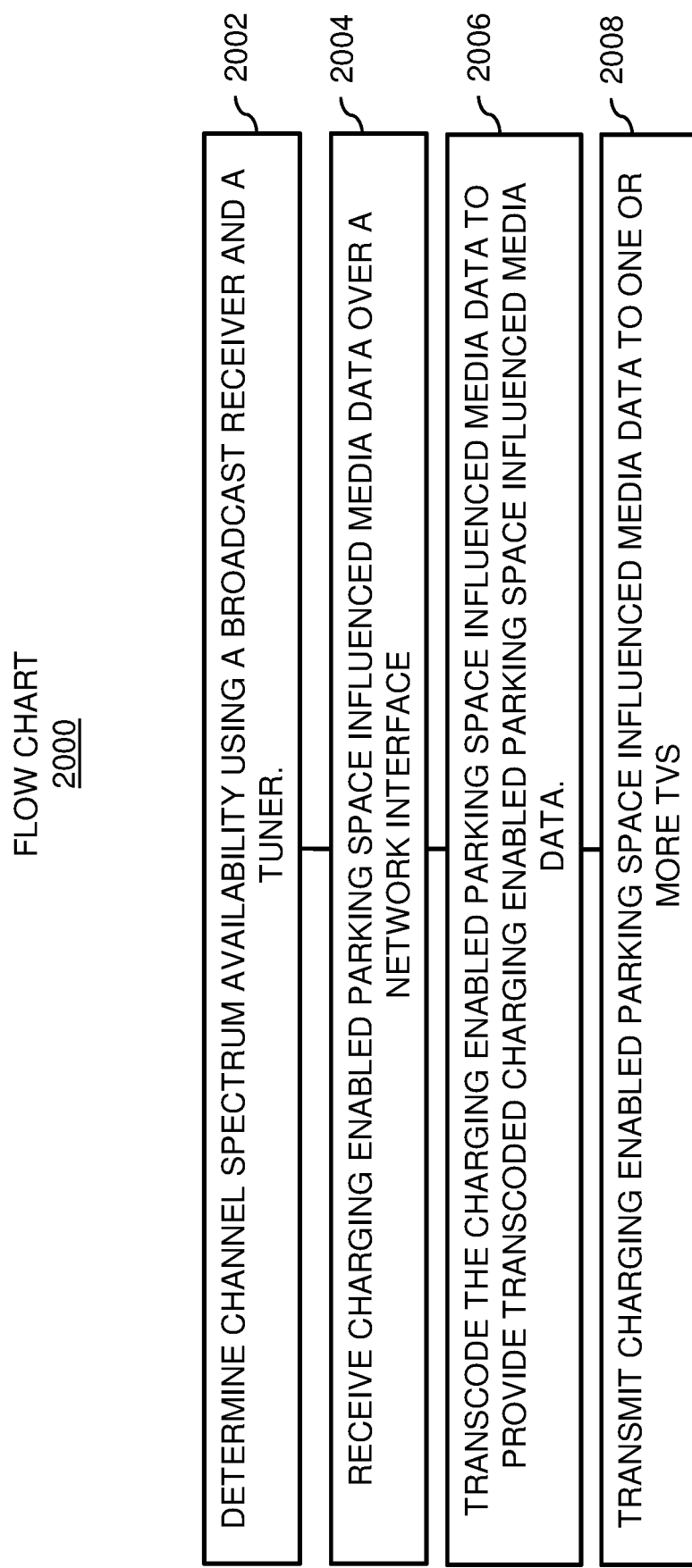
FIG. 20 depicts a flowchart illustrating a method for providing charging enabled parking space influenced media data to one or more televisions (TVs) in accordance with embodiments of the present disclosure.

FIG. 20 depicts a flowchart 2000 illustrating a method for providing at least a portion on charging enabled parking space influenced media data to one or more televisions (TVs) in accordance with embodiments of the present disclosure. The method is implemented on an EV charger having a broadcast transmitter, a broadcast receiver, a tuner, transcoding circuitry, and a network interface (e.g., the EV charger 102 of FIG. 1 and FIG. 2).

In step 2002, the method includes determining channel spectrum availability using the broadcast receiver and the tuner. In other embodiments, the channel spectrum availability may be received over the network interface based on a physical location of the EV charger. For example, the channel spectrum availability may be determined based on a zip code of the physical location.

In step 2004, the method further includes receiving charging enabled parking space influenced media data over the network interface (e.g., the WAN interface 218 or the LAN interface 220 of FIG. 2). The charging enabled parking space influenced media data may be received over the Internet. In some embodiments, the charging enabled parking space influenced media data may be determined based on user information. The user information may include user survey information, user social networking information, and/or the like.

In step 2006, the method further includes transcoding the charging enabled parking space influenced media data to provide transcoded charging enabled parking space influenced media data In step 2008, the method further includes transmitting the transcoded charging enabled parking space influenced media data via the broadcast transmitter to the one or more TVs. In some embodiments, the transcoded charging enabled parking space influenced media data may be used to offset costs associated with home-based EV charging.

In certain embodiments, the charging enabled parking space influenced media data may be in an MPEG-4 (Moving Picture Experts Group) compliant format and the transcoded charging enabled parking space influenced media data may be in an MPEG-2 compliant format.

Figure 21:
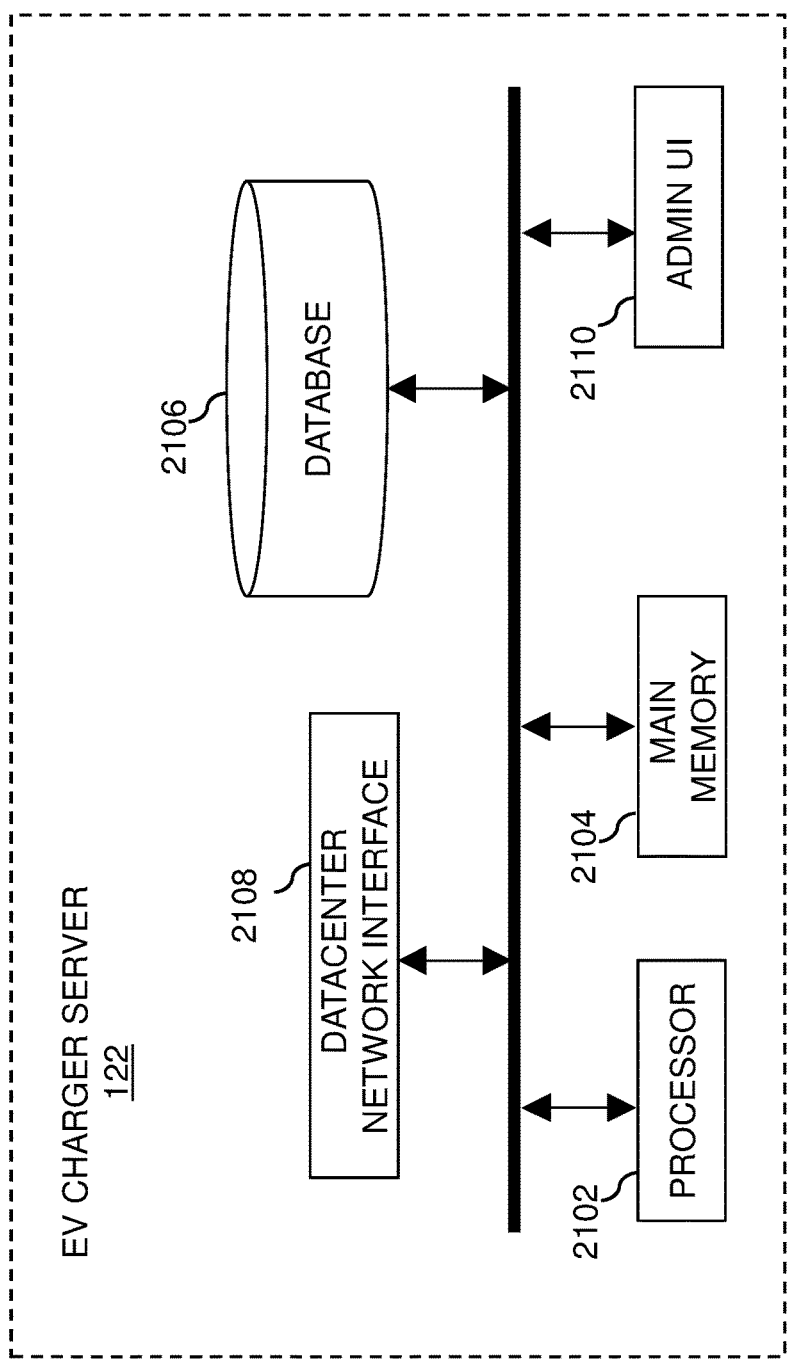
FIG. 21 depicts a block diagram illustrating the EV charger server 122 of FIG. 1 in accordance with embodiments of the present disclosure.

FIG. 21 depicts a block diagram 2100 illustrating the EV charger server 122 of FIG. 1 in accordance with embodiments of the present disclosure. The EV charger server 122 includes at least one of processor 2102, a main memory 2104, a storage memory (e.g., database) 2106, a datacenter network interface 2108, and an administration user interface (UI) 2110. The EV charger server 122 may be configured to host an Ubuntu® server. In some embodiments Ubuntu® server may be distributed over a plurality of hardware servers using hypervisor technology.

The processor 2102 may be a multi-core server class processor suitable for hardware virtualization. The processor may support at least a 64-bit architecture and a single instruction multiple data (SIMD) instruction set. The main memory 2104 may include a combination of volatile memory (e.g., random access memory) and non-volatile memory (e.g., flash memory). The database 2106 may include one or more hard drives. The database 2106 may be configured to store a plurality of charging enabled parking space influenced media data.

The datacenter network interface 2108 may provide one or more high-speed communication ports to the data center switches, routers, and/or network storage appliances. The datacenter network interface 2108 may include high-speed optical Ethernet, InfiniB and (IB), Internet Small Computer System Interface (iSCSI), and/or Fibre Channel interfaces. The administration UI may support local and/or remote configuration of the EV charger server 122 by a datacenter administrator.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An electric vehicle (EV) charger comprising:
   a processor;
   a memory electrically coupled with the processor;
   EV charging circuitry electrically coupled with the processor;
   a network interface electrically coupled with the processor;
   a broadcast transmitter electrically coupled with the processor; and
   a broadcast receiver and a tuner electrically coupled with the processor, wherein:
      the EV charger is configured for home-based EV charging;
      the broadcast transmitter is configured to provide an over-the-air (OTA) signal to a television; and
      the broadcast receiver and the tuner are configured to determine channel spectrum availability for the broadcast transmitter.

2. The EV charger of claim 1, wherein the broadcast transmitter is configured to provide an over-the-air (OTA) signal to a television.

3. The EV charger of claim 1, wherein the OTA signal is compliant to at least one version of an Advanced Television Systems Committee standard or a Digital Video Broadcast-Terrestrial (DVD-T) system standard.

4. The EV charger of claim 1 further comprising an antenna electrically coupled with an output the broadcast transmitter.

5. The EV charger of claim 4, wherein the antenna is at least one of a dipole antenna, a loop antenna, a log periodic antenna, and a multi-bay reflective array antenna.

6. The EV charger of claim 1 further comprising a display electrically coupled with the broadcast receiver and the tuner.

7. The EV charger of claim 1, wherein the EV charger is configured for:
   receiving charging enabled parking space influenced media data over the network interface; and
   transmitting at least a portion of the charging enabled parking space influenced media data via the broadcast transmitter.

8. The EV charger of claim 7, wherein the portion of the charging enabled parking space influenced media data is used to offset costs associated with home-based EV charging.

9. The EV charger of claim 7 further comprising transcoding circuitry electrically coupled between the processor and the broadcast transmitter, wherein the transcoding circuitry is configured to transcode the charging enabled parking space influenced media data to provide the portion of the charging enabled parking space influenced media data.

10. The EV charger of claim 7, wherein the network interface is configured to receive the charging enabled parking space influenced media data over the Internet.

11. A method implemented on an electric vehicle (EV) charger having a broadcast transmitter, a broadcast receiver, a tuner, and a network interface, the method including:
    determining channel spectrum availability for the broadcast transmitter using the broadcast receiver and the tuner;
    receiving charging enabled parking space influenced media data over the network interface; and
    transmitting at least a portion of the charging enabled parking space influenced media data via the broadcast transmitter, wherein the EV charger is configured for home-based EV charging.

12. The method of claim 11, wherein the portion of the charging enabled parking space influenced media data is used to offset costs associated with home-based EV charging.

13. The method of claim 11, wherein the charging enabled parking space influenced media data is determined based on user information.

14. The method of claim 13, wherein the user information includes user survey information.

15. The method of claim 13, wherein the user information includes user social networking information.

16. The method of claim 11, wherein the broadcast transmitter is configured to provide an over-the-air (OTA) signal to a television.

17. The method of claim 11 further comprising transcoding the charging enabled parking space influenced media data to provide the portion of the charging enabled parking space influenced media data.

* * * * *